(12) United States Patent
Rumi et al.

(10) Patent No.: US 7,218,974 B2
(45) Date of Patent: May 15, 2007

(54) INDUSTRIAL PROCESS DATA ACQUISITION AND ANALYSIS

(75) Inventors: Eric M. Rumi, Oakville (CA); Paul J. Zepf, Oakville (CA); John Baird, Oakville (CA); Chris Norris-Lue, Guelph (CA); Tim Rintjema, Hamilton (CA); Yvonne Wu, Mississauga (CA)

(73) Assignee: Zarpac, Inc. (CA)

( * ) Notice: Subject to any disclaimer, the term of this patent is extended or adjusted under 35 U.S.C. 154(b) by 134 days.

(21) Appl. No.: 11/092,861

(22) Filed: Mar. 29, 2005

(65) Prior Publication Data

US 2006/0224254 A1 Oct. 5, 2006

(51) Int. Cl.
*G05B 13/02* (2006.01)
*G05B 21/02* (2006.01)

(52) U.S. Cl. .............. 700/28; 700/37; 700/46; 700/52; 700/73; 318/561; 702/180; 702/181; 702/182; 702/188

(58) Field of Classification Search .............. 700/28, 700/37, 30–31, 34, 46, 52–53, 73–74; 318/561; 702/180, 181, 182, 183, 184, 188
See application file for complete search history.

(56) References Cited

U.S. PATENT DOCUMENTS

| | | | |
|---|---|---|---|
| 4,975,865 A * | 12/1990 | Carrette et al. | 700/10 |
| 5,241,482 A | 8/1993 | Iida | 700/110 |
| 5,311,562 A * | 5/1994 | Palusamy et al. | 376/215 |
| 5,841,964 A | 11/1998 | Yamaguchi | 714/45 |
| 6,110,214 A * | 8/2000 | Klimasauskas | 703/2 |
| 6,144,923 A | 11/2000 | Grosse | 702/56 |
| 6,199,018 B1 * | 3/2001 | Quist et al. | 702/34 |
| 6,356,857 B1 * | 3/2002 | Qin et al. | 702/185 |
| 6,494,765 B2 * | 12/2002 | Gitis et al. | 451/5 |
| 6,499,114 B1 * | 12/2002 | Almstead et al. | 714/25 |
| 6,556,882 B1 | 4/2003 | Conboy | 700/108 |
| 6,625,567 B1 | 9/2003 | McMahan | 702/179 |
| 6,681,197 B2 | 1/2004 | Brunner | 702/182 |
| 6,748,341 B2 | 6/2004 | Crowder, Jr. | 702/181 |
| 6,795,793 B2 | 9/2004 | Shayegan | 702/179 |
| 6,795,935 B1 | 9/2004 | Unkle | 714/37 |
| 6,816,813 B2 | 11/2004 | Tan | 702/181 |
| 6,853,920 B2 | 2/2005 | Hsiung | 702/1 |
| 6,853,954 B2 | 2/2005 | Apostolides | 702/182 |
| 2002/0002414 A1 * | 1/2002 | Hsiung et al. | 700/95 |
| 2002/0026257 A1 | 2/2002 | Newmark | 700/108 |
| 2003/0028830 A1 | 2/2003 | Kallela | 714/47 |
| 2004/0102988 A1 | 5/2004 | Andresen | 705/1 |
| 2004/0117050 A1 | 6/2004 | Oskin | 700/108 |

(Continued)

FOREIGN PATENT DOCUMENTS

CA 2 217 808 4/1999

(Continued)

*Primary Examiner*—Ramesh Patel
(74) *Attorney, Agent, or Firm*—Holland & Knight LLP

(57) ABSTRACT

A method for optimizing an industrial process data is disclosed. The method includes collecting data from a plurality of sensor elements, wherein each sensor element collects data from a portion of the industrial process and verifying the data collected. The method further includes analyzing the data collected for efficiency and generating at least one recommendation for optimizing the industrial process. The method further includes presenting the at least one recommendation generated to an administrator of the industrial process.

20 Claims, 11 Drawing Sheets

U.S. PATENT DOCUMENTS

| | | | |
|---|---|---|---|
| 2005/0085973 A1* | 4/2005 | Furem et al. ................. | 701/50 |
| 2005/0151306 A1* | 7/2005 | Sokolowski et al. .......... | 266/80 |

FOREIGN PATENT DOCUMENTS

| | | |
|---|---|---|
| CA | 2 016 451 | 5/1999 |
| CA | 2300546 | 3/2000 |
| CA | 2394227 | 3/2000 |
| GB | 2380835 | 4/2003 |
| JP | 1260592 | 10/1989 |
| JP | 6167363 | 6/1994 |
| JP | 6168224 | 6/1994 |
| JP | 7105285 | 4/1995 |
| JP | 9066443 | 3/1997 |
| JP | 2002236511 | 8/2002 |
| JP | 2004292055 | 10/2004 |
| WO | WO99/42939 | 8/1999 |
| WO | WO00/02144 | 1/2000 |
| WO | WO00/51037 | 8/2000 |
| WO | WO01/09723 | 8/2001 |
| WO | WO03/060812 | 7/2003 |
| WO | WO2004/036357 | 4/2004 |

* cited by examiner

| Example of a Decision Matrix Array | | | | | | | |
|---|---|---|---|---|---|---|---|
| Date: Oct. 1/04 | | | | By: Paul J. Zepf | | Numerical Scoring | |
| Determination of BCA or Uptime Periods | | | | | | | |
| Beta $\beta$ Value | $\gamma$ (Gamma) Value | Alpha $\mu$ Value | Machine | People | Input | Maintenance | Set Up |
| Shape | Offset | Mean | Design | Function | Materials | Repairs | Points |
| $\beta < 0.9$ | $\gamma \approx$ l-3sigma l | $\mu > 60$ | 6 | 6 | 3 | 3 | 3 |
| $0.9 > \beta < 1.1$ | $\gamma \approx$ l-3sigma l | $\mu > 60$ | 3 | 4 | 6 | 1 | 1 |
| $\beta > 1.1$ | $\gamma \approx$ l-3sigma l | $\mu > 60$ | 1 | 2 | 1 | 3 | 1 |
| $\beta < 0.9$ | $\gamma >$ l-3sigma l | $\mu > 60$ | 1 | 6 | 1 | 0 | 3 |
| $0.9 > \beta < 1.1$ | $\gamma >$ l-3sigma l | $\mu > 60$ | 3 | 3 | 3 | 0 | 1 |
| $\beta > 1.1$ | $\gamma >$ l-3sigma l | $\mu > 60$ | 6 | 1 | 1 | 0 | 0 |
| $\beta < 0.9$ | $\gamma \approx$ l-3sigma l | $\mu < 60$ | 3 | 9 | 3 | 3 | 6 |
| $0.9 > \beta < 1.1$ | $\gamma \approx$ l-3sigma l | $\mu < 60$ | 6 | 6 | 6 | 6 | 6 |
| $\beta > 1.1$ | $\gamma \approx$ l-3sigma l | $\mu < 60$ | 9 | 3 | 3 | 9 | 3 |
| $\beta < 0.9$ | $\gamma >$ l-3sigma l | $\mu < 60$ | 1 | 6 | 3 | 1 | 6 |
| $0.9 > \beta < 1.1$ | $\gamma >$ l-3sigma l | $\mu < 60$ | 3 | 3 | 6 | 1 | 3 |
| $\beta > 1.1$ | $\gamma >$ l-3sigma l | $\mu < 60$ | 6 | 1 | 1 | 3 | 1 |
| Determination of FCA or Failure Corrective Actions | | | | | | | |
| $\beta$ Value | $\gamma$ Value | $\mu$ Value | Machine | People | Input | Maintenance | Set Up |
| Shape | Offset | Mean | Design | Function | Materials | Repairs | Points |
| $\beta < 0.9$ | $\gamma \approx 0.2$ | $\mu < 3$ | 0 | 0 | 3 | 0 | 3 |
| $0.9 > \beta < 1.1$ | $\gamma \approx 0.2$ | $\mu < 3$ | 1 | 1 | 0 | 0 | 3 |
| $\beta > 1.1$ | $\gamma \approx 0.2$ | $\mu < 3$ | 3 | 3 | 0 | 0 | 1 |
| $\beta < 0.9$ | $\gamma > 0.2$ | $\mu < 3$ | 1 | 1 | 3 | 0 | 6 |
| $0.9 > \beta < 1.1$ | $\gamma > 0.2$ | $\mu < 3$ | 3 | 3 | 3 | 0 | 3 |
| $\beta > 1.1$ | $\gamma > 0.2$ | $\mu < 3$ | 3 | 6 | 1 | 0 | 1 |
| $\beta < 0.9$ | $\gamma \approx 0.2$ | $\mu > 3$ | 3 | 3 | 0 | 1 | 6 |
| $0.9 > \beta < 1.1$ | $\gamma \approx 0.2$ | $\mu > 3$ | 6 | 3 | 0 | 1 | 6 |
| $\beta > 1.1$ | $\gamma \approx 0.2$ | $\mu > 3$ | 6 | 6 | 0 | 3 | 3 |
| $\beta < 0.9$ | $\gamma > 0.2$ | $\mu > 3$ | 3 | 3 | 6 | 3 | 9 |
| $0.9 > \beta < 1.1$ | $\gamma > 0.2$ | $\mu > 3$ | 6 | 6 | 6 | 6 | 6 |
| $\beta > 1.1$ | $\gamma > 0.2$ | $\mu > 3$ | 9 | 9 | 3 | 6 | 6 |

The lower the value the less impact it has on that parameter.

| Operator Position | Add operator position value to FCA line values from shape, offset & mean. Then compare FCA value line array to its corresponding BCA value line & highest score of the 5 focus areas shows action areas to focus on. |
|---|---|
| 1 - Within ≤15 of machine HMI | As the data is evaluated & results confirmed, the matrix will iterate until fine tuned for that plant operation. |
| 3 - from 15 to 24 feet from the machine HMI | |
| 6 - from 25 to 40 feet from the machine HMI. | |
| 9 - over 41 feet from the machine HMI. | |

FIG. 5

$$f(t) = \frac{\beta}{\eta}\left(\frac{t-\gamma}{\eta}\right)^{\beta-1} e^{-\left(\frac{t-\gamma}{\eta}\right)^{\beta}}$$

INDUSTRIAL PROCESS DATA ACQUISITION AND ANALYSIS

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

1. Field of the Invention

The invention disclosed broadly relates to the field of industrial and production processes, and more particularly relates to the field of optimization of industrial and production processes.

2. Background of the Invention

Independent research and studies of the last 15 years show that although the efficiency of production processes in some areas are increasing, the increase is small (5 to 10% at most) against massive inefficiencies that exist, even in companies that have adapted the highest available technology and modern techniques. Studies show that on average food companies still have from 20 to 40% efficiency to be gained. In the pharmaceutical industry the numbers range from 50 to 100%. The key standing problem to solve, however, is how much and how to quickly direct effective action to correct and improve processes. The major key to developing filters, algorithms, fuzzy logic and artificial intelligence to give valid and proper decisions and conclusions is to have a robust data collection system that has advanced filters, segmentation, interpreting and display algorithms, fuzzy logic and/or artificial intelligence. A review of the present state of the art shows a deficiency in ensuring that the conclusions drawn from data collection are of the highest caliber of validity from both quantitative and qualitative aspects.

With respect to stoppages and downtime of industrial and production processes, the most critical variables from years of study are 1) human operator efficiency and effectiveness in the performance of his job and 2) determining the impact of his job on the overall production performance and, by extension, his impact on the company overall. There has always been the interplay of machines (such as design, centerlines and maintenance), inputs (materials and supplies) and people since man started producing products en masse. If the parameters of machines and inputs are understood, then humans remain the deciding factor. Indeed, in most even rudimentary industrial and production process studies, humans are the key deciding factor in performance, even on fully automated production processes, because people are the most flexible and self-correcting element of the process.

Although data from machines and inputs appear easy to gather and understand, data gathered from humans and policies are the most difficult to understand but have the biggest impact. There is a growing realization of the need to have the right people at the right time, with the proper skills and training, to yield the highest quality for the lowest cost. People are the most complex aspect to analyze and no clear and objective means exists to aid humans in improving efficiency on an ongoing basis. Further, very few management tools or methodologies exist to quickly and thoroughly critique and verify corrective actions with training and troubleshooting. As a result, production processes can be characterized as uncontrolled and inconsistent due to the human factor and no amount of economical automation can eliminate this most flexible but highly variable and volatile element in a production or industrial process.

Previous approaches from industry have provided basic data collection of counts and machine states over time from equipment or systems to determine when they were running or down. These approaches have collected data from analog and discrete signals within Programmable Logic Controllers (PLCs) and displayed these data when these signals were engaged. (PLCs are robust industrial electronic hardware/software controllers that use Boolean logic or ladder logic to program such things as counters, timers, relays, etc. for the functioning and control of machinery and systems.) In some rare cases these values have been shown relative to each other on screens of software products to assist in relating these points to each other intuitively by the user/operator of the software program. Some initial rules or algorithms have been deployed to relate this information into calculated efficiency values or performance parameters to display to the user/operator for his interpretation. Previous approaches merely displayed this information in varying ways, whether in raw collected data form, simplified parsing of the data or calculated values for the user/operator to view, interpret and make a decision. Some initial filters to the data have been used to allow selected segments of the data to be displayed while ignoring the remainder of the data set or dumping spurious data. Most of the previous approaches have not interpreted data, let alone improved and advanced interpreted data for decision making.

Therefore, a need exists to overcome the problems with the prior art as discussed above, and particularly for a way to optimize industrial and production processes.

SUMMARY OF THE INVENTION

Briefly, according to an embodiment of the present invention, a method for optimizing an industrial process data is disclosed. The method includes collecting data from a plurality of sensor elements, wherein each sensor element collects data from a portion of the industrial process and verifying the data collected. The method further includes analyzing the data collected for efficiency and generating at least one recommendation for optimizing the industrial process. The method further includes presenting the at least one recommendation generated to an administrator of the industrial process.

According to another embodiment of the present invention, an information processing system for optimizing an industrial process is disclosed. The information processing system includes a memory for storing data from a plurality of sensor elements, wherein each sensor element collects data from a portion of the industrial process. The information processing system further includes a processor configured for verifying the data collected, analyzing the data collected for efficiency and generating at least one recommendation for optimizing the industrial process. The information processing system further includes an interface for presenting the at least one recommendation generated to an administrator of the industrial process.

According to another embodiment of the present invention, a computer readable medium including computer instructions for optimizing an industrial process is disclosed. The computer readable medium includes computer instructions for collecting data from a plurality of sensor elements, wherein each sensor element collects data from a portion of the industrial process and verifying the data collected. The computer readable medium further includes computer instructions for analyzing the data collected for efficiency and generating at least one recommendation for optimizing the industrial process. The computer readable medium further includes computer instructions for presenting the at least one recommendation generated to an administrator of the industrial process.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

FIG. 5 is a chart showing a decision matrix array and a corrective action array used by one embodiment of the present invention.

DETAILED DESCRIPTION

Figure 1:
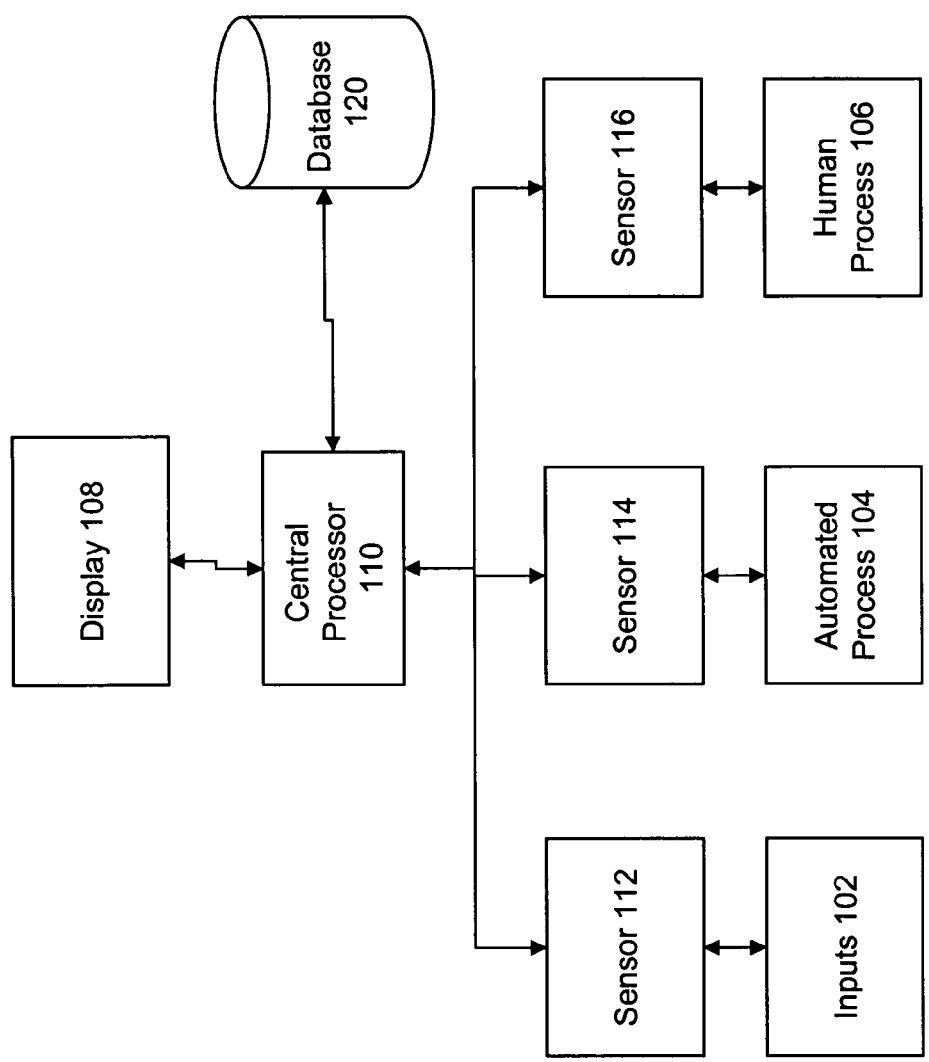
FIG. 1 is a block diagram showing the general system architecture of one embodiment of the present invention.

The currently available approaches to this problem have merely been data collectors and display mechanisms of varying sorts that do not interrogate and interpret collected data or store it as such to guide the user/operator accurately. Various mathematical algorithms, fuzzy logic, advanced interpretive logic, advanced filters and efficient and effective organization of the data is required to guide the user/operator to best practices and conclusions regarding how to act quickly and accurately to improve performance.

Most present manual or automatic data processing systems give good approximate summations including marginally accurate, sorted and semi-cleaned data that can provide marginal to poor presentations and observed conclusions based on viewing the output display.

The present invention fulfills the pressing and growing need to improve and optimize present and future automated production systems in real time. Previous approaches are expensive, time consuming, include high mis-allocation of data and provide reactive concepts and tools. The present invention bridges the gap more effectively in two areas of critical value, but until now not examined and integrated into production processes to any extent. The first area is tying training to performance to demonstrate the value and returns of proper training—a concept which heretofore has not been integrated into production performance. The second area is tying material quality to performance to demonstrate the value and returns of proper material and supply specifications and tolerances—another concept which heretofore has not been integrated into production performance. The present invention provides the methodology and software tools to assist management getting real time reports with action recommends on machine design and function, people competence, input materials, machine set points and maintenance.

The present invention targets people proficiency in order for management to train and guide its production people in an effective and efficient manner. The software tool or tools need to answer the question "Is this person trained, efficient and effective in the tasks required for their job" and if not "Exactly what training, guidance, skill and assistance is required to move the person to be efficient and effective". Also, these tools will assist in helping determine a proper job description for hiring and bring about a workable and economical method of orientation and training for the individual.

The present invention provides advanced performance software that includes built-in algorithms based on concepts of advanced statistical and profiled life characteristics that layout machine fault and event downtimes and repair profiles as well as profile uptime periods. The automated evaluation of these periods by using a self-determining decision matrix will direct the production manager to undertake specific remedial actions, if and when required for a given fault or failure related to a given machine, input material and/or worker. These tasks are integrated within data acquisition software which automatically gathers and pre-sorts the data by line, machine, product, shift, fault, batch, lot, etc. The present invention allows an administrator to profile operator work patterns with any degree of accuracy.

The present invention acquires online real-time refined data of events through an advanced data crunch engine (named "DataCrunch2") to automatically inject the processed logic with data into algorithms that automatically respond by reporting objectively and quantitatively via a decision matrix, the ability and functional level of an worker to control their area of the process and what targeted remedial training and assistance would be required to insure a consistently efficient and effective operator. The present invention leads to an acceleration of the operator's experience and improve training program costs (reduced costs and time for effort) and effectiveness. It will answer the questions "Is this person trained for his job", "How efficient and effective is the training plan" and under U.S. Federal Drug Administration and Health Canada regulations "What proof exists to show that the people are trained and in control of the process?"

The present invention collects and sorts data by company, plant, production line or area, system, or machine. It automatically acquires all signals, counts, time, codes and states of operation including uptime and stoppage/downtime as they relate to manual or automated data time stamping, cleaning, configuring, grouping, organizing. The present invention further verifies data with filters and algorithms for conversion into interpreted data that are then automatically transferred into primary filters, fuzzy logic, artificial intelligence, algorithms to give displays, reports, what ifs, costs, interpretations of system performance parameters and efficiency metrics. The present invention further auto-generates recommendations such as enlightenment, decisions and proposed actions by using secondary filters, algorithms, decision matrices, fuzzy logic, what ifs, costs and artificial intelligence to undertake directed efforts.

The present invention is built on a platform concept of "passive" data collection, meaning that PLCs are not required to be reprogrammed, but instead the system is a non-intrusive observer of the system being monitored. Thus, little or no reprogramming or added programming of any machine, system or production process is required. Therefore, the computer-implemented automated system can assist in finding programming issues in the present system for correction. This greatly ensures that the performance, scan time and functioning aspects of the production process is not affected in any way and in some cases assists in improving the existing PLC programming. The PLC is merely polled for data via its set rules and configuration and the raw data is extracted back to a computer for offline processing, but still in real time.

In life data analysis (also called "Weibull analysis"), the practitioner attempts to make predictions about the life of all products in the population by "fitting" a statistical distribution to life data from a representative sample of units. The parameterized distribution for the data set can then be used to estimate important life characteristics of the product such as reliability or probability of failure at a specific time, the mean life for the product and failure rate. Life data analysis requires the practitioner to: gather life data for the product, select a lifetime distribution that will fit the data and model the life of the product, estimate the parameters that will fit the distribution to the data, generate plots and results that estimate the life characteristics, like reliability or mean life, of the product. An overview of basic concepts in life data analysis is provided below.

The term life data refers to measurements of the life of products. Product lifetimes can be measured in hours, miles, cycles or any other metric that applies to the period of successful operation of a particular product. Since time is a common measure of life, life data points are often called "times-to-failure" and product life will be described in terms of time throughout the rest of this guide. There are different types of life data and because each type provides different information about the life of the product, the analysis method will vary depending on the data type. With complete data, the exact time-to-failure for the unit is known (e.g. the unit failed at 100 hours of operation). With suspended or right censored data, the unit operated successfully for a known period of time and then continued (or could have continued) to operate for an additional unknown period of time (e.g. the unit was still operating at 100 hours of operation). With interval and left censored data, the exact-time-to-failure is unknown but it falls within a known time range. For example, a unit failed between 100 hours and 150 hours (interval censored) or between 0 hours and 100 hours (left censored).

Statistical distributions have been formulated by statisticians, mathematicians and engineers to mathematically model or represent certain behavior. The probability density function (pdf) is a mathematical function that describes the distribution. The pdf can be represented mathematically or on a plot where the x-axis represents time.

Figures 6, 7:
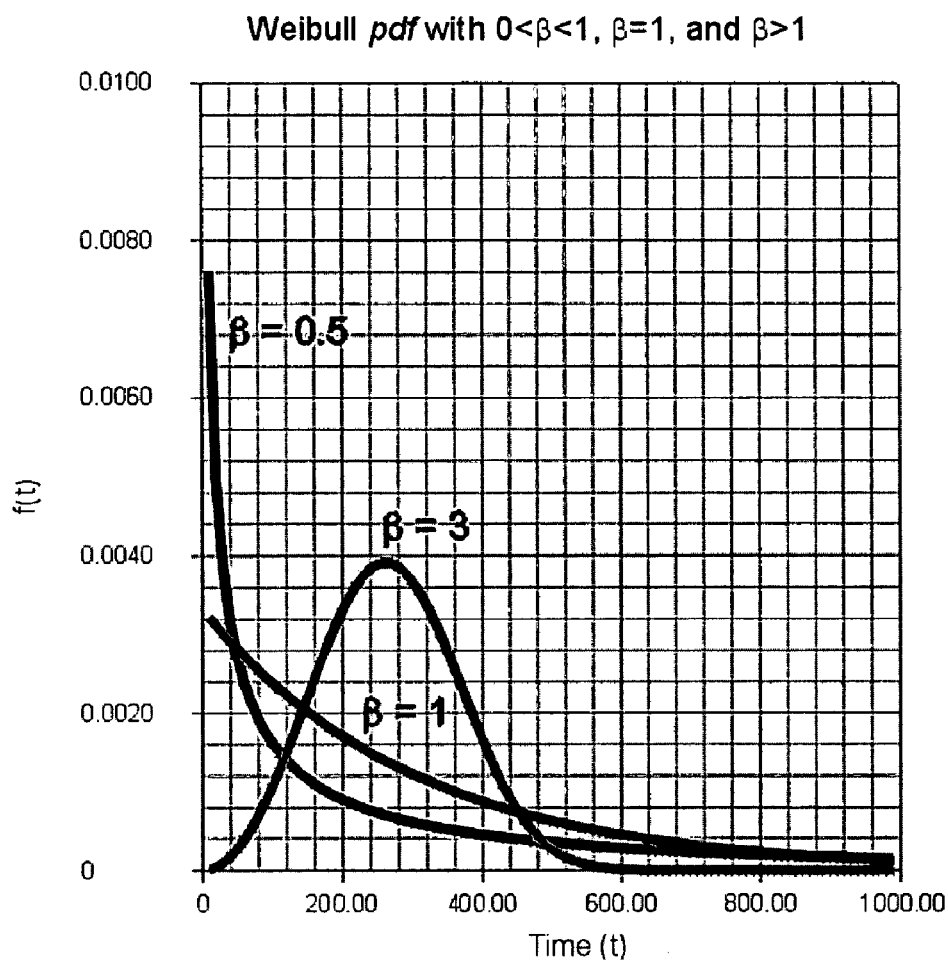
FIG. 6 is an equation for life data analysis, used in one embodiment of the present invention.
FIG. 7 is a chart showing a graph of the equation of FIG. 6, wherein the variable beta $\beta$ is given varying values.

The equation of FIG. 6 gives the pdf for the 3-parameter Weibull distribution. Some distributions, like the Weibull and lognormal, tend to better represent life data and are commonly called lifetime distributions or life distributions. In fact, life data analysis is sometimes called "Weibull analysis" because the Weibull distribution, formulated by Professor Wallodi Weibull, is a popular distribution for analyzing life data. The Weibull distribution can be applied in a variety of forms (including 1-parameter, 2-parameter, 3-parameter or mixed Weibull) and other common life distributions include the exponential, lognormal and normal distributions. The analyst chooses the life distribution that is most appropriate to each particular data set based on past experience and goodness of fit tests.

Figure 8:
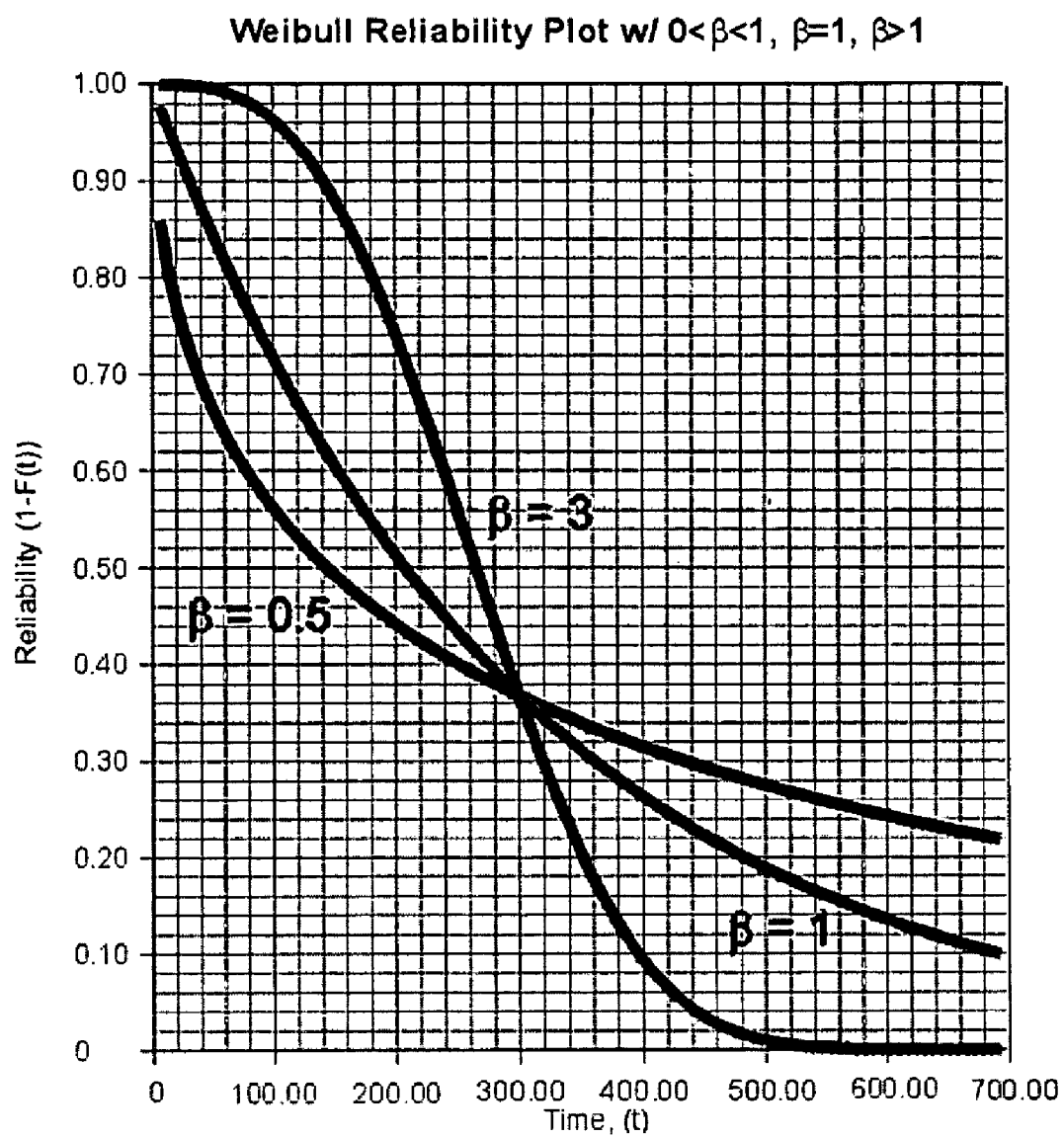
FIG. 8 is a chart showing a Weibull reliability plot, wherein the variable beta $\beta$ is given varying values.
Figure 9:
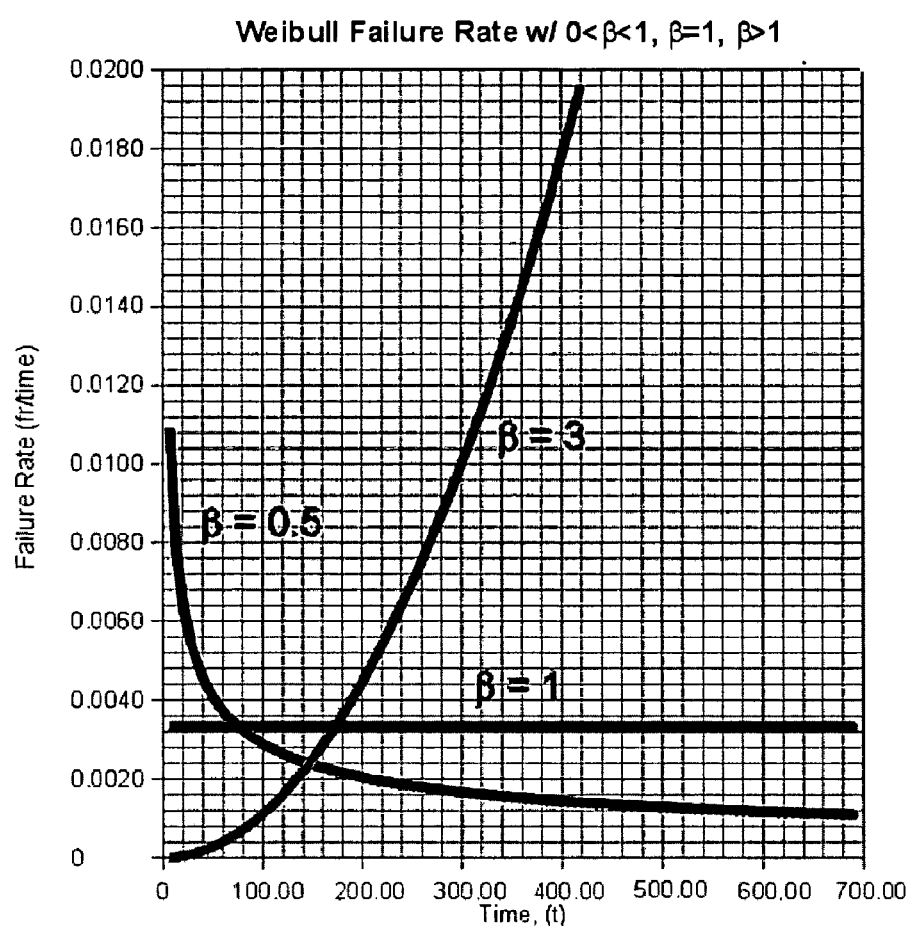
FIG. 9 is a chart showing a Weibull failure rate plot, wherein the variable beta $\beta$ is given varying values.
Figure 10:
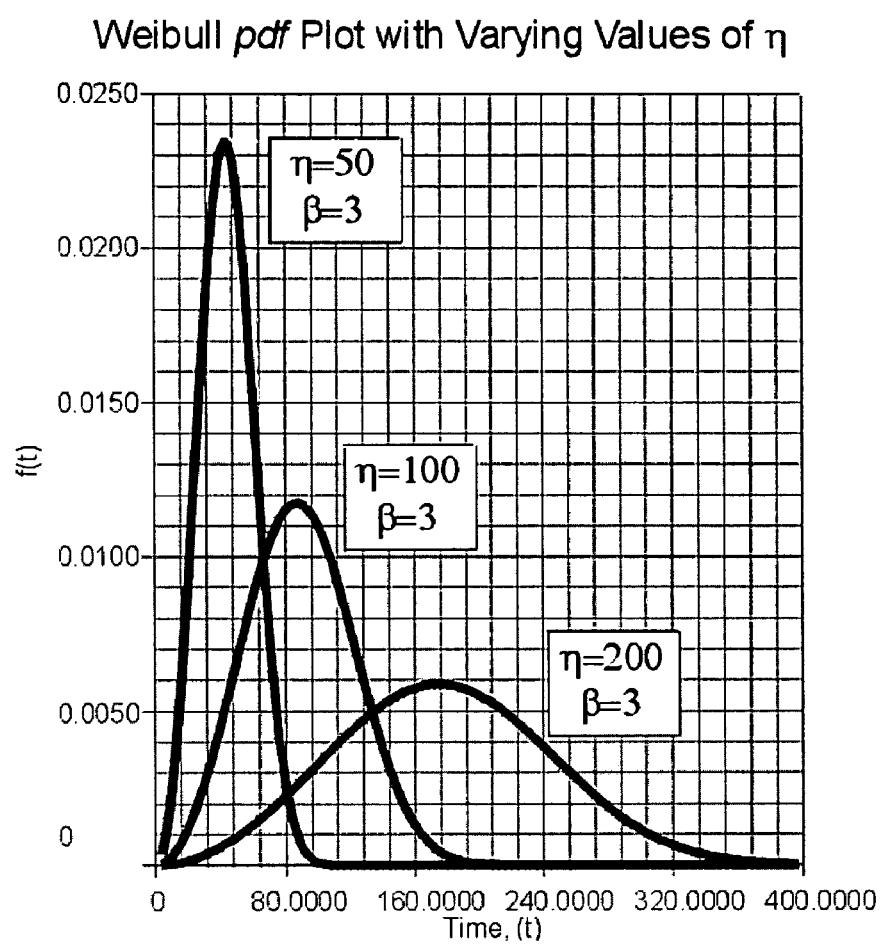
FIG. 10 is a chart showing a Weibull pdf plot, wherein the variables beta and $\eta$ are given varying values.
Figure 11:
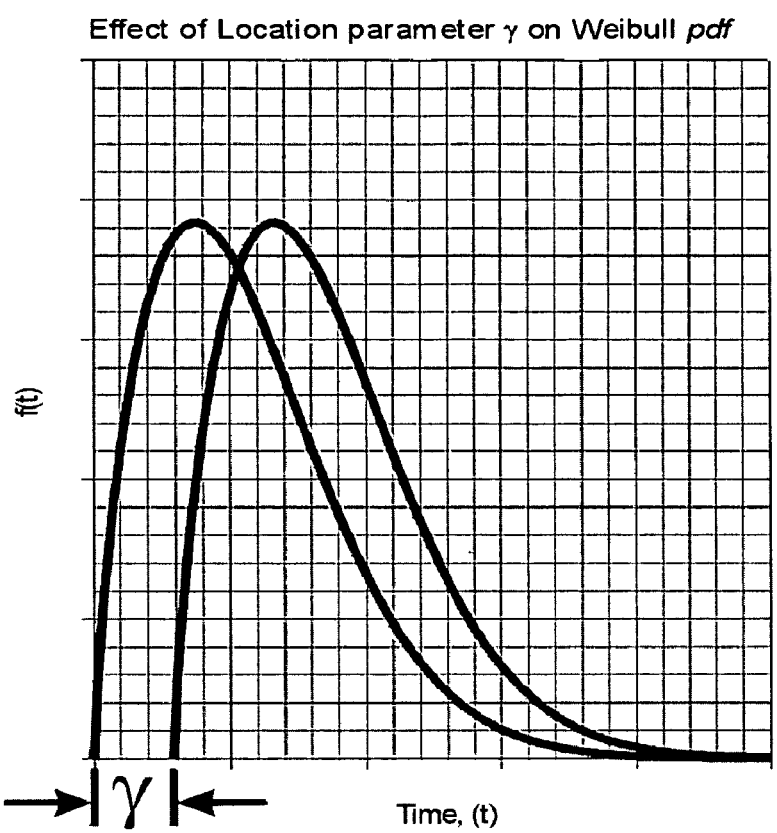
FIG. 11 is a chart showing a Weibull pdf plot, wherein the effect of the location parameter $\gamma$ is shown.

FIG. 7 is a chart showing a graph of the equation of FIG. 6, wherein the variable beta is given varying values. FIG. 8 is a chart showing a Weibull reliability plot, wherein the variable beta is given varying values. FIG. 9 is a chart showing a Weibull failure rate plot, wherein the variable beta is given varying values. FIG. 10 is a chart showing a Weibull pdf plot, wherein the variables beta and $\eta$ are given varying values. FIG. 11 is a chart showing a Weibull pdf plot, wherein the effect of the location parameter $\gamma$ is shown.

In order to "fit" a statistical model to a life data set, the analyst estimates the parameters of the life distribution that will make the function most closely fit the data. The parameters control the scale, shape and location of the pdf function. For example, in the 3-parameter Weibull distribution, the scale parameter, $\eta$ (eta), defines where the bulk of the distribution lies. The shape parameter, $\beta$ (beta), defines the shape of the distribution and the location parameter, $\gamma$ (gamma), defines the location of the distribution in time.

Several methods have been devised to estimate the parameters that will fit a lifetime distribution to a particular data set. Some available parameter estimation methods include: probability plotting, rank regression on x (RRX), rank regression on y (RRY) and maximum likelihood estimation (MLE). The appropriate analysis method will vary depending on the data set and, in some cases, on the life distribution selected.

Once the parameters to fit a life distribution to a particular data set are calculated, a variety of plots and calculated results from the analysis are obtained, including: 1) Reliability Given Time: The probability that a product will operate successfully at a particular point in time. For example, there is an 88% chance that the product will operate successfully after 3 years of operation, 2) Probability of Failure Given Time: The probability that a product will be failed at a particular point in time. Probability of failure is also known as "unreliability" and it is the reciprocal of the reliability. For example, there is a 12% chance that the product will be failed after 3 years of operation (and an 88% chance that it will operate successfully), 3) Mean Life: The average time that the products in the population are expected to operate before failure.

This metric is often referred to as mean time to failure (MTTF) or mean time before failure (MTBF), 4) Failure Rate: The number of failures per unit time that can be expected to occur for the product, 5) Warranty Time: The estimated time when the reliability will be equal to a specified goal. For example, the estimated time of operation is 4 years for a reliability of 90%, 6) B(X) Life: The estimated time when the probability of failure will reach a specified point (X %). For example, if 10% of the products are expected to fail by 4 years of operation, then the B(10) life is 4 years. (Note that this is equivalent to a warranty time of 4 years for a 90% reliability.), 7) Probability Plot: A plot of the probability of failure over time. (Note that probability plots are based on the linearization of a specific distribution. Consequently, the form of a probability plot for one distribution will be different than the form for another.

For example, an exponential distribution probability plot has different axes than that of a normal distribution probability plot.), 8) Reliability vs. Time Plot: A plot of the reliability over time, 9) Pdf Plot: A plot of the probability density function (pdf), 10) Failure Rate vs. Time Plot: A plot of the failure rate over time, 11) Contour Plot: A graphical representation of the possible solutions to the likelihood ratio equation. This is employed to make comparisons between two different data sets.

Because life data analysis results are estimates based on the observed lifetimes of a product's sample, there is uncertainty in the results due to the limited sample sizes. Confidence bounds (also called confidence intervals) are used to quantify this uncertainty due to sampling error by expressing the confidence that a specific interval contains the quantity of interest. Whether or not a specific interval contains the quantity of interest is unknown.

Confidence bounds can be expressed as two-sided or one-sided. Two-sided bounds are used to indicate that the quantity of interest is contained within the bounds with a specific confidence. One-sided bounds are used to indicate that the quantity of interest is above the lower bound or below the upper bound with a specific confidence. Depending on the application, one-sided or two-sided bounds are used. For example, the analyst would use a one-sided lower bound on reliability, a one-sided upper bound for percent failing under warranty and two-sided bounds on the parameters of the distribution. (Note that one-sided and two-sided bounds are related. For example, the 90% lower two-sided bound is the 95% lower one-sided bound and the 90% upper two-sided bounds is the 95% upper one-sided bound.)

FIG. 1 is a block diagram showing the general system architecture of one embodiment of the present invention. FIG. 1 shows a sensor 112 that collects data from input materials 102, a sensor 114 that collects data from an automated process (such as a process of a machine) 104, a sensor 116 that collects data from a human process 106. The sensors can be heat standard sensors, computer programs, components of computer programs, applications, components of a larger application, computers running applications or any other information processing systems capable of collecting and transmitting sensor data. All data collected by the sensors is routed to the central processor 110 and stored in data base 120. In an embodiment of the present invention, central processor 110 can comprise any commercially available computing system that can be programmed to offer the functions of the present invention. In another embodiment of the present invention, central processor 110 can comprise a client computer running a client application that interacts with the sensors as a server computer in a client-server relationship.

In an embodiment where central processor 110 and the sensors are applications or components of applications, the nodes can be implemented as hardware, software or any combination of the two. The applications or components of applications can be located in a distributed fashion in both central processor 110 and the sensors. In this embodiment, the applications or components of applications of central processor 110 and the sensors operate in a distributed computing paradigm.

In an embodiment of the present invention, the computer systems of the central processor 110 and the sensors are one or more Personal Computers (PCs) (e.g., IBM or compatible PC workstations running the Microsoft Windows operating system, Macintosh computers running the Mac OS operating system, or equivalent), Personal Digital Assistants (PDAs), hand held computers, palm top computers, smart phones, game consoles or any other information processing devices. In another embodiment, the computer systems of the central processor 110 and the sensors are a server system (e.g., SUN Ultra workstations running the SunOS operating system or IBM RS/6000 workstations and servers running the AIX operating system). The computer systems of the central processor 110 and the sensors are described in greater detail below with reference to FIG. 12.

In an embodiment of the present invention, a network that includes the central processor 110 and the sensors is a circuit switched network, such as the Public Service Telephone Network (PSTN). In another embodiment, the network is a packet switched network. The packet switched network is a wide area network (WAN), such as the global Internet, a private WAN, a local area network (LAN), a telecommunications network or any combination of the above-mentioned networks. In yet another embodiment, the network is a wired network, a wireless network, a broadcast network or a point-to-point network.

It should be noted that although central processor 110 and the sensors are shown as separate entities in FIG. 1, the functions of both entities may be integrated into one entity. It should also be noted that although FIG. 1 shows only there sensors, the present invention supports any number of sensors.

FIG. 1 further shows a display 108 that includes standard CRT displays, flat panel displays, hand held displays, or desk top displays.

Figure 2:
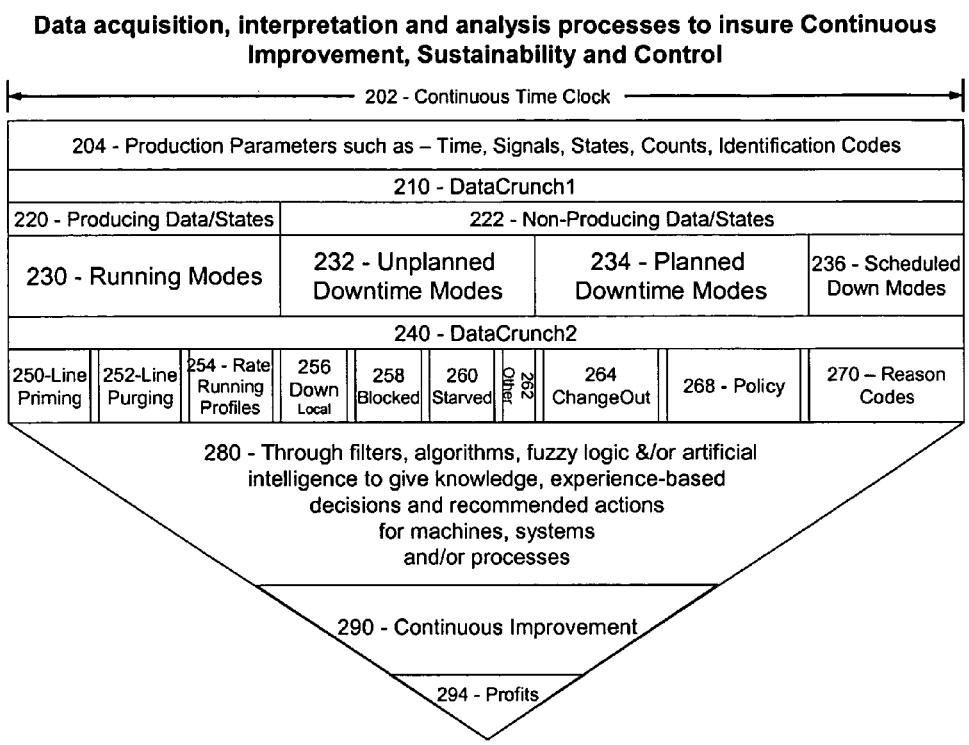
FIG. 2 is a flow chart showing the overall process and control flow of one embodiment of the present invention.

FIG. 2 is a flow chart showing the overall process and control flow of one embodiment of the present invention. In FIG. 2, process step 202 depicts a continuous time clock representing all time whether running production or not. Process step 202 can be as fine as every 1/10 of a second, 24 hours a day, 7 days a week and 52 weeks of the year. Process step 202 can be total continuous monitoring, data gathering and/or analysis. The definition of time used can be calendar time or a customer defined production time and/or days, which are not necessarily the same as calendar days, and may be more or less than 24 hours. Time is defined by an initial configuration set up that may use a simple signal or sequence of events to trigger time periods, which configuration is manually or automatically activated. Production time can be based on product to product run or changeover to changeover or any other time sequencing or periods that can be defined. This time definition establishes the first overall gross filtering of producing and non-producing periods from a scheduling standpoint.

Process step 204 represents the main raw data parameters that are set up to collect from sensors or inputs (either manually or automatically), such as time (absolute and relative), signals from sensors, state of the process at that moment in time (usually every second), counts or number of material inputs or products passing a given point in a given time, (can be less than 1 second resolution—down to 1/10 or perhaps less), identification codes such as bar code, lot number, batch information including batch number, size, product type or group, SKU, UPC/EAN, RFID tag ID, etc. The data can be collected manually, automatically or a combination of methods.

Process step 210 is a process named "DataCrunch1" that is basically the up front engine that allows the initial set up configuration of the given production process parameters and user requirements through which filters and algorithms the raw data is put through time stamping, set up configurations, grouping and allocations. This process is known as an engine for segmenting data into correct and determined conditions, states, etc. such as process step 220 or Producing Data/States or conditions in which production is considered in a running mode or process step 222—Non-Producing Data/States in which it is a period of no production (or test production) that occurs or is planned.

Process step 230 is a group or category under process step 220 that accepts all types of running or producing modes of operation and runs them through the secondary data process engine process step 204, named "DataCrunch2," for filtering and logic arrangement, based on algorithms, fuzzy logic and artificial intelligence, into conditions, present and past comparing, causes and analysis structuring.

Process step 232 is a group or category under process step 222 that accepts all types of non-producing unplanned downtime modes that occur within the operation and runs them through a secondary data process engine process step 240, named "DataCrunch2," for sequencing of event timing, cleaning event data, spurious data identification and allocation, sub-grouping, ramp up and down characteristics, filtering and logic arrangements based on algorithms, fuzzy logic and artificial intelligence into conditions, present and past comparisons to our parameters, causes and analysis structuring. The outcomes are the structured breakdown and arrangement, documentation and analysis of process step 256 or down events (such as failures related to machine, input materials and people, etc.), process step 258 or blocked due to identified and tagged downstream effect(s), process step 260 or starved due to identified and tagged upstream effect(s) and process step 262 or other non-producing events due to the nature of the production process (such as delays due to supplies, wait for process to heat up or cool down, etc. as a result of a failure) or issues such as brown outs, power failures, lightning strike, storms, floods, leaks, strikes, sickness, etc.

Process step 234 is a group or category under process step 222 that accepts all types of non-producing planned downtime modes that happen within the operation and runs them through the secondary data process engine process step 240 for sequencing of event timing, cleaning event data, spurious data identification and allocation, sub-grouping, ramp up and down characteristics, filtering and logic arrangements based on algorithms, fuzzy logic and artificial intelligence into conditions, present and past comparisons to our parameters, causes and analysis structuring. The outcomes are the structured breakdown and arrangement, documentation and analysis of process step 268 or policy events (such as lunches, breaks, meetings, preventative maintenance, etc.) Aid process step 264 or changeovers (such as major, minor, label, SKU, etc.).

Process step 236 is a group or category under process step 222 that accepts all types of other scheduled planned downtime modes that happen within the operation and runs them through the secondary data process engine process step 240 for sequencing of event timing, cleaning event data, spurious data identification and allocation, sub-grouping, ramp up and down characteristics, filtering and logic arrangements based on algorithms, fuzzy logic and artificial intelligence into conditions, present and past comparisons to our parameters, causes and analysis structuring. The outcomes are the structured breakdown and arrangement, documentation and analysis of process step 270 or scheduled down events (such as renovations, over stock inventory, major equipment overhauls, plant shutdown periods, product demand off-season periods).

Note the sequencing of DataCrunch1 and DataCrunch2 is shown as sequential. In reality they can be iterative, parallel or sequential or any combination depending on the analysis and results required for recommendations, decisions and/or actions to undertake.

The data arranged and clarified from process step 250 to process step 270 is further advanced in process step 280 which is a continuation of DataCrunch1 and DataCrunch2 along with the detailed display of the results in order for intuitive conclusions to be able to be done in the way of yield maximization, improving priming profiles related to timing and sequencing, improving purging profiles related to timing and sequencing, improving clearing and cleaning functions, functionability, process maximizing reliability, maintainability, maximizing uptime profiles, life cycles analysis of root causes, contributing rate losses from ramping and speed setting, maximizing people proficiency, improving input quality, reducing downtime, reducing blocked or starved, other states, enhance quick change of changeout by looking at profiles for each product and line, review management decisions on policy, optimum scheduling, minimized wastage, minimized rework, improved designs, improved layouts, staging and material flows, maximum asset utilization, etc.

The results of all these activities is process step 290 or an effective continuous improvement based program based on sound data segmented and interpreted to direct ongoing operational procedures and direction for maximized quality output at the lowest cost. This provides stability, sustainability, control and consistency. This in turn results in process step 294 or the fruitful reward of profits based on a solidly controlled and monitored process.

Figure 3:
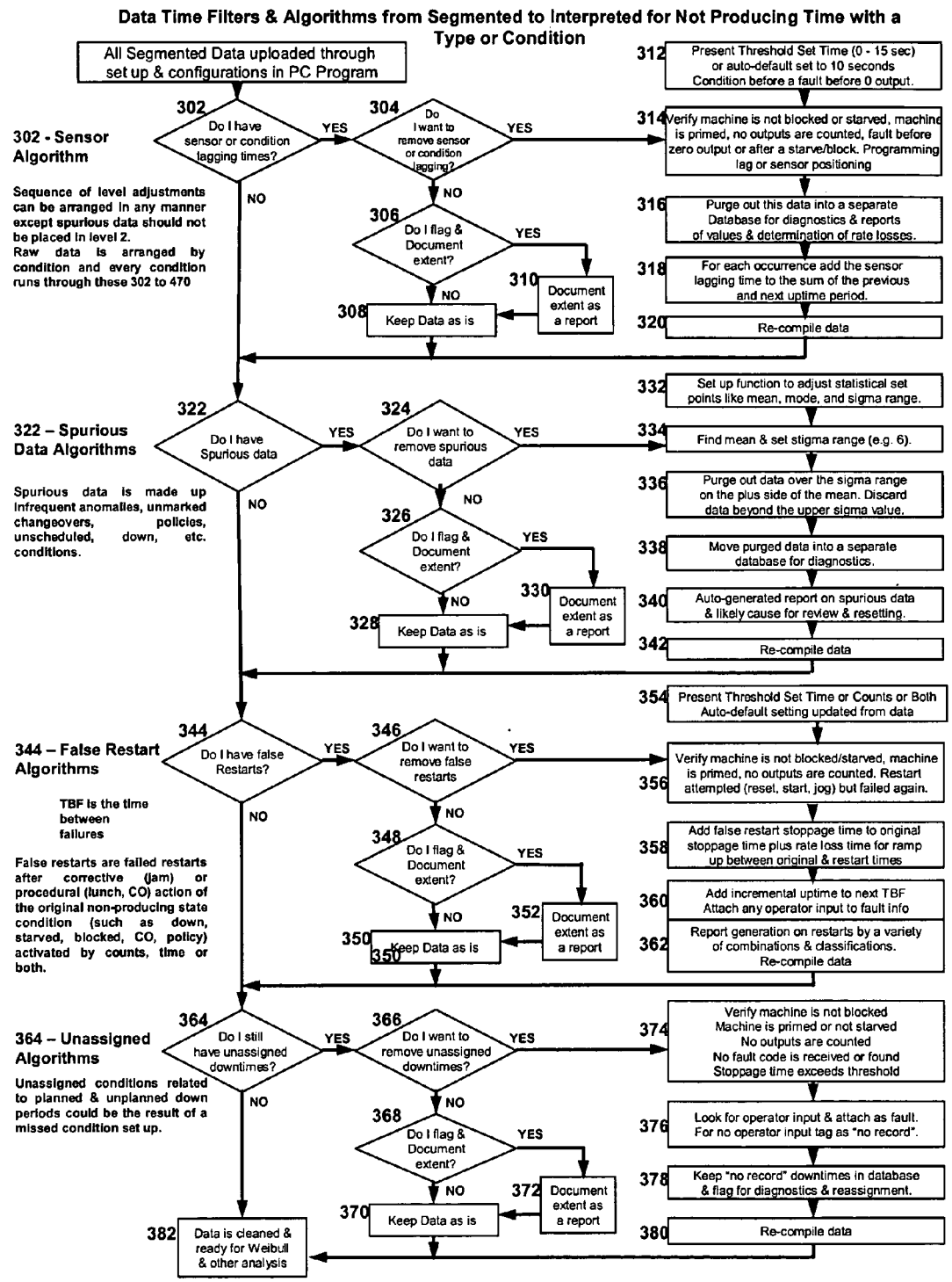
FIG. 3 is a flow chart showing the process and control flow of the data processing step of one embodiment of the present invention.

FIG. 3 is a flow chart showing the process and control flow of the data processing step of one embodiment of the present invention. In FIG. 3, step 302 is processed by a smart logical algorithm that scans the data for periods of time under a given default threshold of 10 seconds (the threshold is adjustable and can be tied into the process to generate its own threshold) that has a no fault or a fault or cause sensor or signal attached to it and there are no counts found at the discharge and the infeed is primed with product to produce. If these conditions are found then it is viewed as sensor condition lagging events and the data is moved to process step 304 for review, otherwise it continues to step 322. If some calculations, directives and decisions require that this data must be left in and process step 304 is informed where the data is to be used and if removal is not required, the data is moved to process step 306. At step 306, the data can be flagged as to the presence of lagging data and documented at process step 310 for diagnostic review by an analyst or production process integrator/programmer for sensor performance and location or allowed to pass through as is at step 308 and then onto step 322.

If some calculations, directives and decisions require that this data must be left out and process step 304 is informed where the data is to be used and if this data must be left out, the data is moved to process step 314. At process step 314, the data is again verified by a pre-set smart logical algorithm, boundaries and guidelines from process step 312 that rescans the data for periods of time under a given default threshold of 10 seconds (the threshold is adjustable up and can be tied into the process to generate its own threshold) that have no fault or cause a sensor or signal to fire as a fault, but the fault does not need correction and the process continues normally and there are no counts found at the discharge and the infeed is primed with product to produce as per process step 314.

This condition can also exist if someone or something took product or process materials out of the production flow momentarily at a point that the sensors would show a non-producing period even though the machine is running normally and then the flow of materials would show up again. This can just be a gap in production, which is more of a rate loss then a true non-producing period from normally known and sensed downtime conditions. By investigating the PLC program, sensor type and location lagging times could be reduced or eliminated and momentary product or input loss can be documented as to counts and timing for further investigations later. These events are not indicative of the tagged fault condition if a fault is tagged and therefore represents data that can skew calculations and decisions on a given fault or root cause. Other possibilities that could cause lagging is that a fault fires before the zero output is sensed or after a starved or blocked situation as per process step 314. Therefore this data must be left out in process step 316, and these small time losses can be documented for further investigations later and for doing diagnostics on sensor types, locations and set up. At process step 318, since the time is real, it must be allocated. Therefore, the value is to be added to the uptime of the previous uptime period and this new value is added to the next uptime period to replace an up/down/up situation to a cumulative aggregate uptime. The raw data is never deleted or changed but is recompiled into an imaged data interpreted and adjusted for lagging periods and then sent to process step 322.

Process step 322 is processed by another smart logical algorithm that scans the first step refined data for periods of time that appear to have data excessively beyond the expected range anticipated. If these conditions are found then it is viewed as spurious data events and the data is moved to process step 324 for review, otherwise it continues to process step 344. If some calculations, directives and decisions require that this data must be left in and process step 324 is informed where the data is to be used and if removal is not required, the data is moved to process step 326. At process step 326, the data can be flagged as to the presence of spurious data and documented at process step 330 for diagnostic review by an analyst or production process integrator/programmer for sensor performance and signal configuration or allowed to pass through as is at process step 328 and then onto process step 344. If some calculations, directives and decisions require that this data must be left out and process step 324 is informed where the data is to be used and if this data must be left out, the data is moved to process step 334.

At process step 334, the data that have values for periods of time that are excessively beyond the expected range anticipated as per process step 336 in that the data is outside the +3 sigma range from the mean of the data coming into process step 322 as determined from pre-set algorithms, boundaries and guidelines from process step 332. For example, this condition can come about if someone or something left an E-stop on over a planned down period or a faulty sensor or a sensor not activated when it should have. By investigating the PLC program, sensor type and triggering method these spurious times could be reduced or eliminated. The spurious data can be documented at process step 338 as to signals and timing for further investigations and diagnostics later. At process step 340 this spurious data can be displayed, printed and arranged for analysis. The arrangement can assist in likely probability of cause. These events are not indicative of the tagged fault condition if a fault is tagged and therefore represents data that can skew calculations and decisions on a given fault or root cause.

Therefore this data must be left out at process step 338, and these small time losses can be documented for further investigations later and for doing diagnostics on sensor types, activations and set up. At process step 338, since the spurious data is real, it must be allocated. Therefore, the values can be viewed and manually allocated if the proper allocation can be made or left to be removed from further decision making assistance. The raw data is never deleted or changed but is recompiled into a imaged data interpreted and adjusted for removing spurious data at process step 342 and then sent to process step 344.

Process step 344 is processed by another smart logical algorithm scans the second step refined data for periods of time that appear to have false restarts. If these conditions are found then it is viewed as machine downtime repetitive sequences of very short durations and the data is moved to process step 346 for review, otherwise it continues to process step 364. If some calculations, directives and decisions require that this data must be left in and process step 346 is informed where the data is to be used and if removal is not required, the data is moved to process step 348. At process step 348, the data can be flagged as to the presence of spurious data and documented at process step 352 for diagnostic review by an analyst or production process integrator/programmer for sensor performance and signal configuration or allowed to pass through as is at process step 350 and then onto process step 364. If some calculations, directives and decisions require that this data must be left out and process step 346 is informed where the data is to be used and if this data must be left out, the data is moved to process step 356.

At process step 356, the data that have patterns and data as per directives from algorithms, boundaries and guidelines in process step 354 and the machine is not blocked or starved, the machine is primed, there is a pattern of no output and then a trickle or none within a short time span as determined statistical analysis it is a false restart or failure corrective action that is determined at process step 356. When a false restart is tagged at process step 358 and the time of the false restart down period of zero output is added to the previous tagged down fault time period and the time between is the attempted ramp up. At process step 360, if the attempted ramp up period output is zero it is also added to the previous tagged down fault time. But if at process step 360 the attempted false restart period output is 1 or greater, then it is treated as a true ramp up and an equivalent downtime period is calculated from the expected target output to the actual output and that is added to the previous tagged down fault time period. Any output and its equivalent uptime period is added to the upcoming uptime period. It is possible to have a daisy chain of false restarts from one failure. As per process step 358, the logic starts with the closest false restart to the actual failure and finishes with last false restart found.

At process step 362 all information on false restarts is tabulated for diagnostics and training reviews later concerning that failure and is compared to other workers or against established targets or benchmarks. At process step 362 false restart as well as cleared recompiled data can be displayed, printed and arranged for analysis. The arrangement can assist in likely probability of causes or false restarts and recommended corrective actions. These events are not indicative of the tagged fault condition if a fault is tagged and therefore represents data that can skew calculations and decisions on a given fault or root cause. Therefore this data must be reallocated and compiled at process step 362. The raw data is never deleted or changed but is recompiled into a imaged data interpreted and adjusted for reallocating false restart data at process step 362 and then sent to process step 364.

Process step 364 is processed by another smart logical algorithm that scans the third step refined data for periods of time that appear to have unassigned downtimes. If these conditions are found then it is viewed as missing information on a given downtime or production condition that cannot be allocated, the data is moved to process step 366 for review, otherwise it continues to process step 382. If some calculations, directives and decisions require that this data must be left in and process step 366 is informed where the data is to be used and if removal is not required, the data is moved to process step 368. At process step 368, the data can be flagged as to the presence of unassigned data and documented at process step 372 for later diagnostic review by an analyst or production process integrator/programmer for manual allocation. Then the data is allowed to pass through as is at 3370 and then onto process step 382. If some calculations, directives and decisions require that this data must be left out and process step 366 is informed where the data is to be used and if this data must be left out, the data is moved to process step 374.

At process step 374, the data that have unassigned tags to any condition, the logic attempts to define or re-look for possible fault code fits. Failing this, it moves to process step 376 to scan the manual entry comment section for those conditions and if comments were made attaches them in process step 378 into a database of unassigned conditions for review and manual allocation. Upon manual allocation, the original raw database is unaltered, but a layer of information is overlaid with the condition carrying a flag to show that it was manually allocated and the date. At process step 362 all information on unassigned conditions is tabulated for diagnostics and reviews later. At 380 the data is recompiled and can be displayed, printed and arranged for analysis. These unassigned events may not be indicative of any given tagged fault condition and therefore represents data that can skew calculations and decisions on a given fault or root cause. Therefore, unassigned data should not be reallocated and compiled into the data at process step 380. The raw data is never deleted or changed but is recompiled into a imaged data interpreted and adjusted for dealing with unassigned data at process step 380 and then sent to process step 382 to continue with other higher level analysis.

Figure 4:
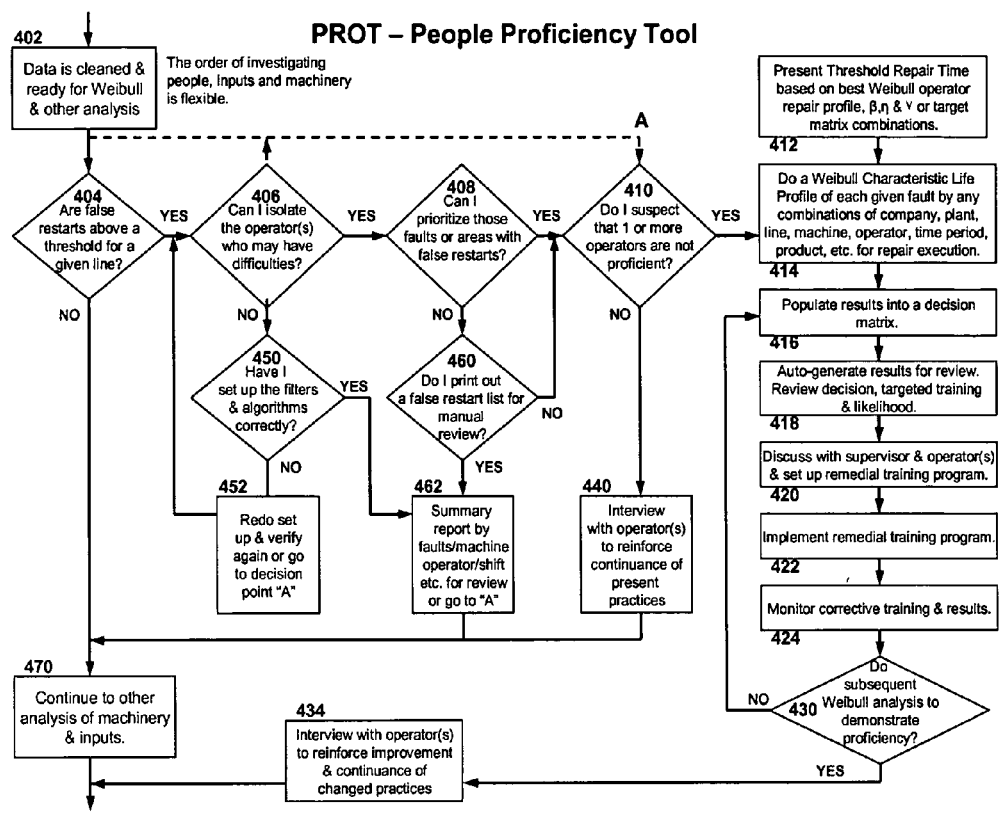
FIG. 4 is a flow chart showing the process and control flow of the human data evaluation step of one embodiment of the present invention.

FIG. 4 is a flow chart showing the process and control flow of the human data evaluation step of one embodiment of the present invention. In FIG. 4, process step 402 is the end point of step 382 in FIG. 3 of the process of control flow for interpreting data. At process step 404, a smart logical algorithm looks back and sees if false re-start conditions had existed for the time period under investigation. If no false restart conditions existed, the logic proceeds to process step 470 with the segmented and interpreted data to be used in other analysis. If there were false restarts, then the data moves to process step 406. At process step 406 algorithms segregate the data by worker or shift, date and time. If this cannot be done go the process step 450 and review filters and algorithms.

If the filters and algorithms are not set up to identify, redo the set up and verify again or go to "A" at process step 410 without knowing the workers and continue doing analysis on groups or singles based on aggregates. If the filters and algorithms are set up correctly go to process step 462 and only give out the summary report by line, machine, fault, operator, shift for manual review or go to "A" at process step 410 or go to process step 470. Back at process step 406, if we can isolate the operator's who may have difficulties or performance issues then proceed to process step 408. At process step 408 the software attempts to prioritize the faults according to the number of false restarts. If it cannot prioritize the false restarts, a print out list is compiled and printed out for manual review along with a summary report from process step 462 and one is given a choice to continue to process step 470 or go to process step 410 for further processing without knowing the priority of the false restarts to faults and continue doing individual analysis on the aggregate or manually review each fault analysis.

At process step 410, the following question is asked: does the preliminary data show that false restarts are less than 15% for any individual as a default or any other adjustable set value of all occurrences? If so, transfer to process step 440. At process step 440 interview those individuals to reinforce that their performance is good and to reinforce not to change present practices. If any individual shows higher than the default or set level of false restarts continue to do a full 3-parameter Weibull characteristic life profile at process step 414 from equations, thresholds and values pre-set in process step 412. Process step 412 also holds the present threshold repair time values based on either the best operator or target matrix combinations. The results populate a decision matrix array in process step 416 as shown in FIG. 5.

Logic and rules review the matrix and auto-generate a decision report on the individual or group regarding strengths, weaknesses, proficiency, training program issues. Next the report is reviewed by the supervisor and the individual evaluated at process step 420 to discuss and develop a remedial training program to address weak areas. Areas of strength are to be reinforced to ensure no changes in these areas.

The remedial program is implemented at process step 422. The program is monitored through this tool to ensure anticipated results are achieved and to then at process step 430 to assist in reviewing the overall training program to make changes as required to improve the overall caliber and speed of training. Sometimes several iterations and testing periods need to be done to achieve the targeted results. At the end of the training process step 434 and the acquired new level of proficiency, the worker needs to receive reinforcement and congratulations or incentive to reinforce the change and to maintain the required change. From process step 434 the data goes to process step 470 for further analysis with the assurance that the data is clean and the workers are interfacing and operating the equipment properly. For here the data is very effective for machine and input material analysis using present developed logic and algorithms.

In an embodiment of the present invention, logic can be used by the present invention to determine that no error has occurred, when a sensor has logged an error or fault. The following evaluations can be used to determine that no fault has occurred: 1) there are no output product counts beyond a pre-defined minimum base or threshold time before or after a fault, starve, blocked or other condition or in any combination that would be out of sync with reality, 2) the infeed to the machine is primed with product and therefore is not starved, 3) the machine is not blocked in any manner and/or 4) the machine through its internal/external sensors or other sensors integrated into the production process records no fault to exist related to that event or time. Thus, a sensor or condition lag situation is detected and is tagged accordingly and feeds back information to maintain or adjust the threshold which monitors the data that is cleaned out as part of the requirement for good interpreted data.

In an embodiment of the present invention, logic can be used by the present invention to allow either a manual set or automatic preset default range of time. The following evaluations can be used to this end: 1)there are output product counts beyond a pre-defined minimum base or threshold; 2) the infeed to the machine is primed with product and therefore is not starved; 3) the machine is not blocked in any manner and/or 4) the machine through its internal/external sensors or other sensors integrated into the production process records no fault to exist related to the condition or time period.

In an embodiment of the present invention, algorithms can be used by the present invention to choose the duration of the before/after look back/forward windows to equal when it reaches X % efficiency or other thresholds or performance indicators that may be able to be derived through algorithms. During the before or after logic sequences it is possible to have a residual trickle of output and a ramp up of output from the normal production run rate or a ramp down of output from the normal production run rate. These transient conditions represent production rate losses due to a production process ramp down (going to downtime) or ram up (recovering back up to full output rate). An algorithm or fuzzy logic or artificial intelligence determines and calculates these losses and allocates as to a rate loss and its time losses (or other performance indicators) which can be added to the downtime periods of zero output or run loss during the producing time to give the real true condition of the production environment at any given point in time as to the real extent of time and losses from any downtime or stoppage period.

In one embodiment of the present invention, a relationship can exist that defines a sensor trip time lag or condition feedback to the computer or PLC that can be determined by the nature of the sensor and/or condition, its position in the production process relative to the machine and other sensors in the production process and of the nature of the target itself to cause false non-producing conditions or states that are not correct. The logic is that if a no output count exists related to that event and the machine, and it falls below the threshold manually or automatically calculated, then it is filtered out of the production process data. The data can be discarded or placed in a separate database to use in an algorithm or fuzzy logic or artificial intelligence in updating and feedback into the filter lag calculations as well as the database can be used for sensor and position as well as condition validations and diagnostics.

In another embodiment of the present invention, an algorithm or fuzzy logic or artificial intelligence determines the false restarts and the durations of the false restarts with its ramp up time as well as the time to again correct the condition that resulted in zero production output. All false restarts have a single episode or multiple fingerprint cascades of run/down/run/down/run or down/up/down/up or other similar combinations that are distinct from sensor or condition lag periods. Down is any non-producing period of time and up is any producing period in which some output results or for which the start button or sequence has been initiated. By definition, the time for down cannot be zero and the time for up cannot be zero. The time-between false-restarts are a function of the counts, condition and/or fault and the robustness of the initial corrective action and each subsequent corrective action. It is a sequence of events relating to the ability of an authorized person to correct the fault the first time and not have repetitive restarts to either test the corrective action or redo the corrective action.

Testing the corrective action usually is determined by the stop/reset/jog (test) or stop/reset/start normal run mode or any other safe machine activation sequence. These sequences can be determined and allocated as a test sequence that was successful or not or as a failed corrective action if a downtime period subsequently resulted from the test immediately or as a time lag. It is possible to have competing causes that impact the ability to restart, but they are still a function of the initial cause and all competing causes need to be trained into the operator to understand, correct the fault or condition and check possible competing causes to minimize competing causes from impacting the start up. Competing causes are still a function of knowledge and training. The false-restart time allowance between conditions or faults for any worker, general work population doing the same job, or experienced worker can be derived from a time value that is a factor or derivative of the minimum between conditions or faults time value for each of those groups.

The minimum between conditions or faults time value can be automatically or manually found or determined by using statistical significance and statistical values to find the lowest possible time values between conditions or faults calculated from the data such as the, the lowest mode time value of that condition or fault occurring for that worker or a factor of the Weibull gamma time value (curve x-axis shift parameter, with the x-axis being time) of that condition or fault occurring by that worker. Usually, the general work population doing the same job time value is used as the threshold time value for determining a re-start.

To determine if there is a proficiency or training problem, the worker time value can then be compared to other operators or experienced trained people by using their false restarts determinate values or profiles or to established benchmark time periods or to pre-set time limits or to the lowest mode time values of the conditions or faults for the general population of workers doing the same job description (or the best worker) or to Weibull gamma time values (curve x-axis shift parameter, with the x-axis being time) for the general population (or the best worker) or best practices time periods or best times from present or past workers that have done the same job description or to training outcome pre-determinate time values. These factors can be used as indicators to find people with above or below target job proficiency and help verify training programs.

False-restarts give erroneous statistical results, because one downtime could have five false-restarts and could be recorded five times and could show five false downtime periods. The false-restarts are attributable to the initial downtime or stoppage and the actions of the operator subsequently contributed more downtime periods and time. In an embodiment of the present invention, an algorithm determines the false restarts and the durations of the false restart with its ramp up and down time and counts as well as the time to again correct the condition.

Another algorithm takes this data and using a set of rules statistically or proportionately or analytically adds the false-restart times to the initial downtime period along with a statistically or proportionately or analytical amount of the run or ramp up time between false-restarts to give one new adjusted aggregate downtime period. The remaining time portion of rate output time is added to the subsequent validated run time to give an adjusted new run time period between stoppages or failures (downtime periods). These are called the adjusted time of stoppage or downtime and the adjusted run time between stoppages or downtime. Thus, a more realistic and workable process to give more accurate mean time of failures and mean time between failures is provided, along with more realistic and valid Weibull equations and parameters to give characteristics that assist the decision matrix in giving the proper work profiles of operators doing corrective actions, troubleshooting and/or other operational functional performance.

In another embodiment of the present invention, the data on corrective actions is used to evaluate workers to ensure and demonstrate with high quality data and assurance the quality control and consistency in operations for regulatory compliance.

In yet another embodiment of the present invention, the data on corrective actions is used to evaluate the effectiveness and efficiency of the training program that was used to obtain the observed result and using this data to undertake the proper remedial action to improve the worker's performance and also assist in reviewing and improving the training program.

In yet another embodiment of the present invention, algorithms are used to look back or forward in the counts to determine instantaneous yield losses during running as well as the period when the downtime logic should actually engage to determine the actual yield loss of the down event and it's duration considering through actual calculations the possible production ramp down and ramp up within that condition period and not just accept a zero count (or going to going) as the duration as is done presently and is not accurate and skews the data.

In the present state of the art, First Out Fault Determination for the downtime state only is performed by monitoring all faults that may stop the machine from running. If one sensor fires, in combination or related with no starved and blocked conditions and zero output, this is determined to be the reason for the downtime. If more than one fires, it is determined which fires first and use that as the cause or pointer to the cause. If there is a tie, they are listed in priority order in the setup and choose the first one in the list. In an embodiment of the present invention, the faults are prioritized and if left at a lower priority, ignored if they fire with a higher priority fault or threshold signal. There is a selectable or modifiable "look back" window to determine when to start looking for which fault firing. It is based on when the downtime begins, which is based on when zero output happens or a ramp down is detected. Events of less than a certain time threshold can be programmed to be investigated and allocated to a separate database for validation for sensor, false restart or condition allocation and diagnostics.

In another embodiment of the present invention, the lower priority is ignored or, a priority matrix, a knowledge algorithm or fault structure fuzzy logic is used to break the tie, rather than that which is simply higher in the listing, which is not necessarily correct. Furthermore certain faults are allowed to have higher priority than others within groups, in order to separate groups of faults from other groups and have the priority work within the group, yet be separate of the overall priority method now in place. These features fine tune the ability to zero in on the causes of the stoppage or downtime or condition in reality and not the symptoms and maximize the ability to discover and improve machine, inputs (materials and supplies) and human issues.

In another embodiment of the present invention, a determination of conditions and states is made. This feature is not only used for determining cases such as downtime, starved, blocked, policies or change outs and all other stops, but can be made generic across all the states such as running and idle so that they could be analyzed in the same manner. For instance, the original rule for downtime can be significantly re-written so that when zero output is observed, the signal type fired first is sought (down, blocked, starved, policy or any other generic new state) and then the look back algorithm is used to determine when it started and the look forward algorithm to determine when it ended. In conjunction to this logic, this feature could determine the first out reason by the new priority/grouping logic within that state. It would then assign the first out reason based on the current logic, but would do this within the new group method and then determine which group by the priority algorithm or fuzzy logic method. This would determine the duration and time of the loss and the actual count loss based on the new logic. This feature allows flexibility for the administrator of the program to set up.

In another embodiment of the present invention, known Weibull equations and analysis are allowed to take the first out logic with the profiles characteristics of the duration of periods of non-production or stoppages or downtime, along with their ramp down and ramp up characteristics to be used with the characteristics of the stoppage or downtime duration to populate a decision matrix that would profile the fault correcting and running profiles of the targeted machine, its worker(s) and inputs (materials and supplies) along with more insight into determining further steps to ascertain root cause and action plans for training and operators etc.

The steps for accomplishing the above are outlined below:
1) determine three-parameter Weibull equations and analysis to take the first out logic with the profiles characteristics of the duration of periods of non-production or stoppages or downtime, along with their ramp down and ramp up characteristics to be used with the characteristics of the stoppage or downtime duration to populate a decision matrix array that would profile the fault correcting and running profiles of the targeted machine, (or system or production line), its worker(s) and inputs (materials and supplies) along with more insight into determining further steps to ascertain root cause and action plans for training and operators etc. This feature reconfirms using a different approach to the extent of a proficiency or training problem, as well as demonstrate its relationship with input materials, machine, maintenance and MSS.

The Weibull equations used are the three-parameter Weibull as outlined in the generally known knowledge below. A two-parameter Weibull could also be used but would have reduced resolution. This will characterize the mathematics employed in examining failures durations and the time between failure durations to input into a decision matrix as shown or variation thereof (can develop and use smaller arrays) decision arrays from which instructions on the direction and location of actions to undertake will be derived from a weighting key for each combination of parameters given.

The decision matrix array is based on twelve parameters in the y direction. They are zones or defined areas the scale parameter, (eta)f, defines where the bulk of the distribution lies or expected duration of failure or repair, the shape parameter, (beta)f, defines the shape of the distribution or quick to correct (premature), satisfactory (random) or lack of repair consistency (pull out curve to be more normal) and the location parameter, (gamma)f, defines the location of the distribution in time or ideal minimum time of failure or time to correct failure under the prevailing conditions, the scale parameter, (eta)bf, defines where the bulk of the distribution lies or expected duration between failures, the shape parameter, (beta) bf, defines the shape of the distribution or type of between failure profile (premature or severe infant mortality), satisfactory (random) or exhibits wear out characteristics (pull out curve to appear to be a skewed normal profile) and the location parameter (gamma) bf, which defines the location of the distribution in time or ideal minimum time between failures or time shift. These by zone or area parameters are used for each of between failure analysis and the failure (or corrective action). The eta, beta and gamma values are taken from the probability density function, but other functions can be used with the corresponding change in the values of the matrix to reflect observed experience.

The x direction parameters are up to five or possibly more potential parameters such as people proficiency and training, operating people position relative the machine or system position, quality of input materials and supplies, machine, maintenance, and MSS (maintainability, sustainability, steady state which basically targets set point stability or ability of the machine or system to be set to and maintain good settings for maintaining quality production at rate) for each of between failure analysis and the failure (or corrective action).

A combination of any x and y in the array will trigger a scale of possibilities. The scale is limited to 1, 3, 6 and 9 to give better differentiation, with the higher score giving the gravity of the impact on machine or system position, quality of input materials and supplies, machine, maintenance, and MSS (maintainability, sustainability, steady state which basically targets set point stability or ability of the machine or system to be set to and maintain good settings for maintaining quality production at rate).

The developed matrix is the culmination of expert experience, mathematics, human behavior and real acquired segmented and interpreted data for the production line under examination, therefore it is a form of artificial intelligence.

FIG. 5 is a chart showing a decision matrix array used by one embodiment of the present invention. FIG. 5 arrays the Beta, Gamma and Alpha values from the Weibull equation determination from the actual cleaned data. The combination of Beta, Gamma and Alpha of the applicable BCA or Uptime periods and FCA or Failure Corrective Action periods will determine the weighting of main classifications such as machine design, people function, input materials, maintenance repairs and set up points. The array can have other or more or less parameters to apply a weight, but experience has shown these to be the most common to use. This array is built of through time on expert experience and knowledge about the nature of this type of production line and as time goes on the accumulated data and knowledge will assist in fine tuning these values to reflect better and better conclusions and weighting. In effect it is a form of artificial intelligence that is improving and evolving over time.

Knowledge of other and similar processes are built up over time to help improve the matrix array. In time fuzzy logic can be written to self-improve itself as the body of data and the confirmation of the decision made and improvements resulting will assist in adjusting the values in the matrix so the results obtain will get better through time.

FIG. 5 further shows a chart showing a corrective action array used by one embodiment of the present invention. From FIG. 5 the corrective action array is the applicable row of the BCA or Uptime periods and FCA or Failure Corrective Action periods classifications such as design, people function, input materials, maintenance repairs and set up points. These two applicable rows are pulled together of the matrix to determine the action recommended. The value or factored value of FCA and BCA are added or factored together for each classification. The highest value is the area of number one priority that is impacting this root cause or fault. The next highest value is the area of number two priority that is impacting this root cause or fault and so on. When two values are of equal weighting then the priorities are equal and both are equally impacting the root cause or fault. The report is a listing of the priorities in which the focus of work should be concentrated on to address that fault or root cause. It will assist in directing efforts to the area that will eliminate or mitigate the fault in the best and most efficient manner. As more data and knowledge is acquired the matrix array for decision and action will evolve into a self-improving improvement tool.

The current known but proprietary comparing algorithm of actual performance alongside expected performance analysis looks at a singe machine (say the filler) and allows the administrator to determine which machines upstream are eligible to determine the reason for the starved and/or then the machines downstream that are eligible to determine the reasons for blocked. It simply then looks at these machines when the state (blocked or starved) is flagged by any type of control, pressure, weight, presence or motion sensor and checks to see which eligible machine was down first within a time threshold. In an embodiment of the present invention, improved logic for all the states or conditions are used, which inherently makes it different in how the blocked or starved states or conditions are determined in the first place. Next the downtime state is determined differently for the upstream or downstream eligible machine. Lastly, look back windows in time are used to choose which eligible machine was down first. After this, actual performance is compared to expected performance, with accuracy.

The present invention permits a machine to be set up in a production line database, then added to any number of other production lines in any other part of the company or other production lines within the same environment. For example, a palletizer could be added to a "Palletizers" folder without having to set it up a second time. All pertinent set up and reference data and details would be transferred or copied over and asked to be verified.

Currently the present state of the art records every exception when it occurs into an Event Log, overwriting older data when the file is too large. In an embodiment of the present invention, the invention records the minimum data necessary to permit viewing and analyzing troubleshooting issues which occurred days before by reducing redundant information by indicating within a time window how many times and error or occurrence happened instead of logging each event and ballooning the file to such a size that reaches its maximum size and then forces an over-writing of what could be critical data.

In an embodiment of the present invention, the invention uses signals and/or counts to condition all lost production, instead of relying exclusively on the assigned state conditions of the affected machine. This would allow a slow-running machine to assign its lost potential when it can detect the reason for the slowdown from internal or external sensors and logic. In another embodiment of the present invention, the invention reads data from any source, including a database field. This would expand its capability beyond the present standard Object Linking and Embedding for Process Control (OPC). In another embodiment of the present invention, the element state chart can have tool-tips to show details of states and output bars as well as show how the state or condition was derived from.

An outline of an OPC server approach to making a database accessible to any outside software for any data and its analysis and reports is outlined below. A new service is created, such as an OPC Server, which would run on the PI server. OPC clients could request data based on predefined formats. The data is then used in reports, display boards, other databases, etc. For example, a client would connect to a "OPC Server", then request data in a format such as: "Line1.Filler.Output.CurrentShift" This would look up the asset's data for the time selected. Formats are chosen which meet the likely needs of clients. For example: "Line1.Packer.SystemUtil[05/02/01–05/02/07]"

In yet another embodiment of the present invention, the invention attempts to reconnect to OPC servers which have failed. Retry attempts must be limited to avoid lengthy timeouts and other reconnection issues. In yet another embodiment of the present invention, algorithms, fuzzy logic and artificial intelligence to determine if a downtime or stoppage is directly attributed to the worker, machine or material inputs or supplies. Determinations can be done by any one or combination of the following methods—weighting, decision matrices, probability and/or confidence levels based on the decision matrices from the Weibull characteristic life analysis.

In yet another embodiment of the present invention, algorithms and sensing count arrays are used to determine net output with complete reconciliations, rework and wastage counts of the assemblage and/or individual inputs such as materials and supplies elements coming from each machine, conveyor, system, production line, plant and company by product and/or each element of the total package as shipped to the customer. In yet another embodiment of the present invention, algorithms, tests and/or protocols to determine the nature, sequence and timing of each stage of a changeover procedure for analysis and improvements of tooling, change procedures, parallel and series event determinations, identifying steps or elements to do the process correctly and completely, sequence of change over, operator or mechanic or electrician proficiency, training and skills using sequential, parallel or combination models or simulations. Determination of redundancy events of their elimination or integration as well as sequential rearrangement for optimum efficiency can be achieved.

In yet another embodiment of the present invention, the invention effectuates the identifying and integrating maintenance related issues based on six modes of reliability failures that are recognized today and using this information on failure modes to determine the type of maintenance as to replace on failure or based on replacement life determinations and thereby be able to set up part or component lifecycle programming based on historical accumulated data.

In yet another embodiment of the present invention, the invention tracks when and what was performed in improvements as they are undertaken in or around the production process and determine with accuracy the extent and change in production process to determine, compare and learn as to what was predicted and what actually resulted in order to feed that information back to improve the fuzzy logic and artificial intelligent programming to improve the forecasting of expected results and their return on investment or safety improvements.

In yet another embodiment of the present invention, the invention effectuates an automatic redundancy database backup running in the background but lagging by a predetermined pace to insure backup and security to records and when a software self-checking algorithm finds a corruption, bug, or error that crashes the system, it tags the error, auto-switches to the backup database before the error and continues data collecting and functions, so the primary database can be reviewed and put back online. The interruption and loss is minimal and the integrity of the system is enhanced.

In yet another embodiment of the present invention, the entire system is configured to automatically e-mail and/or send reports and/or onscreen alerts concerning set up, sensors, conditions, data quality, performance, status and suggested fixes. For example, the system could detect that a machine is recording output counts but remains in a starved state. The system could e-mail; send a report and give a screen alert or any combination, a description of the situation and the suggestion that the primed sensor is malfunctioning, and include its address and comments for investigation and recommendations.

Spurious data is made up of infrequent anomalies, unmarked changeouts, policies, unscheduled periods, down periods and any conditions that are not representative of that condition. In yet another embodiment of the present invention, the test for spurious data is the algorithm of after sensor and condition lagging times have been dealt with (but not necessarily done in this sequence), the mean and standard deviation is calculated. All values above three standard deviations (3 sigma) on the plus side of the mean are removed from the database for analysis (interpreted data) and moved to a separate database where analysis and diagnostics can be done manually or automatically to reallocate the data.

In yet another embodiment of the present invention, after all the filters and algorithms have done their work and a couple of downtimes or others states or conditions have no reason and are unassigned, then the worker comment window is checked for manually inputted information related to this time and/or count period and that is attached to the condition for all reports and analysis. If no worker comment is found the condition is tagged "no record" and sent into the interpreted database as well as copied to a log for diagnostics and reassignment. Unassigned conditions or states can be related to planned and unplanned down periods from missed condition set ups.

In yet another embodiment of the present invention, wherein when a clear decision cannot be made then a calculated weighting, probability determination or confidence level of best choice through the use of algorithms or fuzzy logic or artificial intelligence or combination will be determined that will give a weighted or percent assurance of an given a recommendation or action that will improve performance and/or eliminate downtime or problematic situations.

In yet another embodiment of the present invention, past and present historical interpreted data can be used for determinations and projections of ongoing time to completion based on present pace and past performance interpretations based on elements such as product, SKU, shift, workers and all other parameters in the database.

In yet another embodiment of the present invention, past and present historical interpreted data in the accumulated database along with pattern recognition can be used for projections and calculations of future rates per unit of time, training programs, input quality programs and scheduling determinations for iterative improvements in scheduling, training, time utilization and asset utilization. The accumulated worth in the interpreted data from the historical is a management planning tool for corporate strategy and planning related to such areas as marketing, production, distribution, manpower utilization, quality and time and cost to market.

In additions, faults and sensors-detected anomalies are the same thing. Some anomalies are not detected or found, but the present invention has the highest known ability of finding and recording detected and non-detected anomalies through its data algorithms.

In an embodiment of the present invention, the counter logic allows counts to be read from a counter which does not need to be reset at any time, and can handle any rollover threshold. Each counter has "read" cycles and "write" cycles. The read cycle updates the cumulative value of the counter, and executes roughly every two seconds. The write cycle stores the time-stamped accumulated value of the counter into the database, and executes as a default once per minute on the minute but can be set to any set time interval.

With regards to the read cycle, the absolute value of the counter is read and compared with the previous value. If larger, the difference is added to the running total. If smaller, the change required to create an equivalent rollover is calculated and compared to the "maximum per minute" value. If less than or equal, this change is added to the running total; otherwise a reset or counter malfunction is assumed and the value is not changed. For all reads, the observed time change and observed count change are compared to the permitted "maximum per minute" value. If the value is exceeded, then the value is "clipped" to prevent anomalous spikes in the data.

If the data quality of any count is bad, then a "bad counter" disturbance is created, and continues until good data is reacquired. At this time, the data crunch algorithm will interpolate the net change over the bad data time, and try to fill in the missing counts (e.g. counter changes from 100 to 300 over 5 minutes of bad count quality; create 5 counts of 40 each to fill in the gap).

With regards to the write cycle, once each minute on the minute, the running total of each counter is taken and written into the database, both as a time-stamped value and an overall total for the time segment. Multiple counters of a common type are combined automatically. The running total is then cleared and counting begins anew. The number of times the counter was clipped the maximum effective speed are written to an event log.

The present invention discloses a method and system for measuring and improving the performance of manufacturing processes related to machines, systems and people. The present invention uses at least one of fuzzy logic, acquisition algorithms, decision/interpretive algorithms and flexible reporting of any aspect of the data collected. The present invention includes a memory configured to store instructions, a processor configured to execute instructions for predictive models that predict variable production aspects from automatically collected data, an optimizer that cleans, analyzes and arranges the input variables based upon desired output variables, an attached database library that stores data, and an artificial intelligence that converts requests and information into causes, effects and costs along with recommended decisions and actions.

In an embodiment of the present invention, an authorized person can use a quick-pick screen to activate algorithms and artificial intelligence to receive requests and information via the production floor, any office computer terminal via a network or via the internet to view; interrogate; request reports; request analysis; request decisions and execute any combination of "what if's" based on real time ongoing machine, system or production processes, past historical machine, system or production processes or any combination.

In another embodiment of the present invention, a means for individually or simultaneously accessing any production line/area, in any production or industrial plant, in any country is disclosed. Any combination of a multiplicity of machines, production lines/areas, plants and countries can be easily picked, analyzed and displayed for comparisons and decisions. These features are applicable to all manual, semi-automatic and fully automatic production or industrial processes that have a layout concept and/or process flow that is sequential (in series), parallel or any various combinations of the two.

The features of the present invention are applicable to all manual, semi-automatic and fully automatic production or industrial processes that utilize all types of rotary, inline, continuous, intermittent, indexing, oscillating, vibrating, conveyors, buffers, and all types of machinery, equipment and systems required for production lines/areas or processes. Warehousing, aerospace, military, nuclear, power generation, construction and automotive industries can use the present invention to use in part or in whole and improve their types of systems and processes and can demonstrate control of their industrial processes and perform what if scenarios.

In another embodiment of the present invention, all acquired raw data is put through a system of filters and algorithms that cleans, set up, configures, allocates, groups, organizes and verifies into segmented data that is put into a structured compacted and rapid response database. This structured database is internal to the program and is online for instant retrieval and dumping into any filter, algorithm, fuzzy logic or artificial intelligence to render an analysis, decision or action to undertake.

In another embodiment of the present invention, the invention effectuates the providing predictive models that predict an output, efficiencies or availabilities from input data automatically collected; providing a training analyzer that reviews, analyses and recommends procedural and training aspects to demonstrate an efficient, effective and safe worker controlling a process that can be demonstrated to be in control and yielding predictable consistent performance.

In another embodiment of the present invention, the invention effectuates the acts of providing predictive models that predict an output, efficiencies, uptime or availabilities from input data automatically collected; providing a decision which specifics a recommendation or action that will improve performance and/or eliminate downtime or problematic situations and increase uptime.

In another embodiment of the present invention, the invention segments the collected data as to producing and non-producing periods and then further breaks down into Running Modes, Unplanned Downtime Modes, Planned Downtime Modes and Unscheduled Modes. The Running Mode is divided into line priming or start up, line purging or end of run and rate running profiles. The Unplanned Downtime Modes or Unscheduled Modes are broken down into down or downtime due to a fault, jam or lost time situation in the industrial or production process, blocked or product backing up into the machine from a downstream effects, starved or product not primed or not available to produce due to upstream effects and other states as defined due to the nature of the industrial process. Planned Downtime Modes are non-producing times related to changeout or a change and clean up from one product to another by SKU, product type, product size, label code, strength or formulation, etc. Aid policy periods or non-producing ongoing management mandated down periods as to lunches, breaks, meetings, sanitation procedures, PM maintenance, etc. The Scheduled Modes are non-producing times related to long-term management mandated down periods for major renovations, plant shutdowns, inventory year end, extensive planned maintenance, etc.

In another embodiment of the present invention, data from different plants, lines/areas or machines or systems can be combined and the totals are reported in normalized units for comparisons and analysis. In another embodiment of the present invention, the user may choose via a pick and choose select menu which types of production or process states are included in any utilization calculations. In another embodiment of the present invention, downtime data can be filtered to exclude events greater than or less than any chosen thresholds.

In yet another embodiment of the present invention, in utilization, any state(s) can be broken down by condition where applicable. Each state can independently be totaled or broken down. In another embodiment of the present invention, each downtime condition level (condition, area, category, cause, etc.) can be independently and simultaneously broken down and/or filtered by any selection. In another embodiment of the present invention, assets can be analyzed at higher levels than before. Utilization can be calculated for plant and company, report parameters can be rolled up, etc. In another embodiment of the present invention, all signals can be composed of rungs of simple logic, AND+OR. This allows expressions to be used without reprogramming the PLC. This can be expanded to allow more complex expression and parentheses to be used. This can also be expanded to all production and non-producing states (changeout, policy, etc).

In another embodiment of the present invention, the invention can view any data combination and that recipe combination can now be stored as a "favorite" and recalled with a few clicks. This includes the choice of asset, SKU, relative time, data type and all parameters on a daily, weekly or any calendar pick combination. In another embodiment of the present invention, the invention uses master routines to collect all state, signal, count and time-based data, both cached and custom time range, for all grouping and filtering options. In another embodiment of the present invention, the system can have the element-state display enhanced to allow the states and signals for two or more machines on a line to be displayed next to each other, as is currently the case for machines on different lines.

In yet another embodiment of the present invention, the invention can have the state data stored by all conditions levels (condition, area, category, cause). This allows data to be filtered and broken down independently in any combination of levels and the critical speed of transaction is not visibly observed. In another embodiment of the present invention, the invention can have all types of selections to be favorites and usable independently, i.e. single click selections for commonly used combinations of time, SKU, asset and data. They would be accessible in their respective locations (time tab, SKU tab, etc). This facilitates the ability to compare non-standard time selections (e.g. this week's performance against previous two weeks). There would still be the option to combine the selections into one favorite which chooses time, SKU, asset and data simultaneously.

In another embodiment of the present invention, the invention can have the filter plus breakdown features already implemented improved and advanced to be applied everywhere in the program. This common approach would make the system powerful and easy to understand, since it would work the same everywhere. For example, selecting a line and breaking down by machine, or machine type, or by any SKU. To illustrate, the "shift filter" requested by a client would be just another filter+breakdown option under time. There would also be the powerful option of breaking down different types of data simultaneously, e.g. break down by day AND by SKU in the same view.

In another embodiment of the present invention, the invention can self-acquire data and information from a multitude of sources including digital and analog sensors utilizing a multitude of algorithms and a multitude of data, information, and computer function and formula patterns, the ability to transmit raw, segmented and interpreted and validated data in a compact form without intruding on existing or planned factory PC an PLC controlled operations or other factory automation systems and their communications and functions. In another embodiment of the present invention, automatic secure and seamless updating of the software as to new updates, bug repairs and investigations or testing over the internet or modem using a secured and verifiable process is included.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following: a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Figure 12:
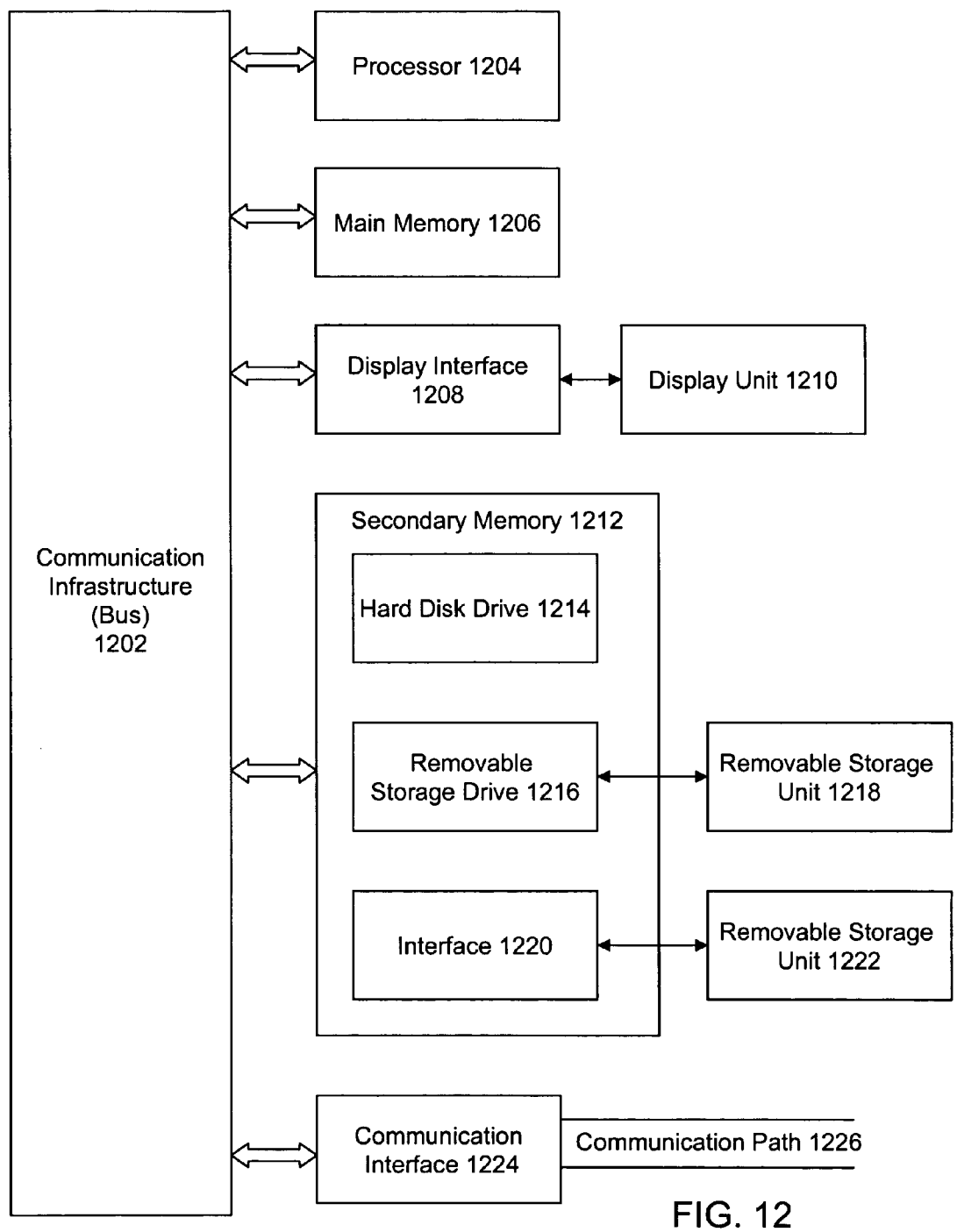
FIG. 12 is a high level block diagram showing an information processing system useful for implementing one embodiment of the present invention.

FIG. 12 is a high level block diagram showing an information processing system useful for implementing one embodiment of the present invention. The computer system includes one or more processors, such as processor 1204. The processor 1204 is connected to a communication infrastructure 1202 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 1208 that forwards graphics, text, and other data from the communication infrastructure 1202 (or from a frame buffer not shown) for display on the display unit 1210. The computer system also includes a main memory 1206, preferably random access memory (RAM), and may also include a secondary memory 1212. The secondary memory 1212 may include, for example, a hard disk drive 1214 and/or a removable storage drive 1216, representing a floppy disk drive, a magnetic tape drive, an optical disk drive, etc. The removable storage drive 1216 reads from and/or writes to a removable storage unit 1218 in a manner well known to those having ordinary skill in the art. Removable storage unit 1218, represents a floppy disk, a compact disc, magnetic tape, optical disk, etc. which is read by and written to by removable storage drive 1216. As will be appreciated, the removable storage unit 1218 includes a computer readable medium having stored therein computer software and/or data.

In alternative embodiments, the secondary memory 1212 may include other similar means for allowing computer programs or other instructions to be loaded into the computer system. Such means may include, for example, a removable storage unit 1222 and an interface 1220. Examples of such may include a program cartridge and cartridge interface (such as that found in video game devices), a removable memory chip (such as an EPROM, or PROM) and associated socket, and other removable storage units 1222 and interfaces 1220 which allow software and data to be transferred from the removable storage unit 1222 to the computer system.

The computer system may also include a communications interface 1224. Communications interface 1224 allows software and data to be transferred between the computer system and external devices. Examples of communications interface 1224 may include a modem, a network interface (such as an Ethernet card), a communications port, a PCM-CIA slot and card, etc. Software and data transferred via communications interface 1224 are in the form of signals which may be, for example, electronic, electromagnetic, optical, or other signals capable of being received by communications interface 1224. These signals are provided to communications interface 1224 via a communications path (i.e., channel) 1226. This channel 1226 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 1206 and secondary memory 1212, removable storage drive 1216, a hard disk installed in hard disk drive 1214, and signals. These computer program products are means for providing software to the computer system. The computer readable medium allows the computer system to read data, instructions, messages or message packets, and other computer readable information from the computer readable medium.

Computer programs (also called computer control logic) are stored in main memory 1206 and/or secondary memory 1212. Computer programs may also be received via communications interface 1224. Such computer programs, when executed, enable the computer system to perform the features of the present invention as discussed herein. In particular, the computer programs, when executed, enable the processor 1204 to perform the features of the computer system. Accordingly, such computer programs represent controllers of the computer system.

What has been shown and discussed is a highly-simplified depiction of a programmable computer apparatus. Those skilled in the art will appreciate that other low-level components and connections are required in any practical application of a computer apparatus.

Therefore, while there has been described what is presently considered to be the preferred embodiment, it will be understood by those skilled in the art that other modifications can be made within the spirit of the invention.

What is claimed is:

1. A method for optimizing an industrial process, comprising:
   collecting data from a plurality of sensor elements, wherein each sensor element collects data from a portion of the industrial process;
   filtering the collected data by:
      computing the mean and standard deviation of the collected data and separating the collected data into a collection of spurious data and a collection of filtered data based upon whether the collected data is a preselected multiple of the standard deviation above or a preselected multiple of the standard deviation below, respectively, the computed mean; or
      separating the collected data into a collection of spurious data and a collection of filtered data based upon whether the collected data repeats itself within a given time threshold; or
      separating the collected data into a collection of spurious data and a collection of filtered data based upon whether the collected data is below a preselected threshold;
   generating at least one recommendation for optimizing the industrial process based upon the collection of filtered data; and
   presenting the at least one recommendation generated to an administrator of the industrial process.

2. The method of claim 1, wherein the industrial process comprises a plurality of portions.

3. The method of claim 1, wherein a sensor element collects data from any one of:
   a machine;
   a material input into a machine; and
   a human operator.

4. The method of claim 1, wherein the step of generating comprises:
   generating at least one recommendation for optimizing the industrial process, wherein a recommendation includes a proposed change in training of an operator of the industrial process.

5. The method of claim 1, wherein the step of generating comprises:

generating at least one recommendation for optimizing the industrial process, wherein a recommendation includes a proposed change in a machine of the industrial process.

6. The method of claim 1, wherein the step of generating comprises:
generating at least one recommendation for optimizing the industrial process, wherein a recommendation includes a proposed change in an input material of the industrial process.

7. The method of claim 1, wherein the step of presenting comprises:
presenting the at least one recommendation generated to an administrator of the industrial process via a display.

8. A system comprising one or more computer-readable media encoded with computer-readable instructions for optimizing an industrial process which, when executed, implement a method for:
collecting data from a plurality of sensor elements, wherein each sensor element collects data from a portion of the industrial process;
filtering the data collected by:
computing the mean and standard deviation of the collected data and separating the collected data into a collection of spurious data and a collection of filtered data based upon whether the collected data is a preselected multiple of the standard deviation above or a preselected multiple of the standard deviation below, respectively, the computed mean; or
separating the collected data into a collection of spurious data and a collection of filtered data based upon whether the collected data repeats itself within a given time threshold; or
separating the collected data into a collection of spurious data and a collection of filtered data based upon whether the collected data is below a preselected threshold;
generating at least one recommendation for optimizing the industrial process based upon the collection of filtered data; and
presenting the at least one recommendation generated to an administrator of the industrial process.

9. The computer readable medium of claim 8, wherein the industrial process comprises a plurality of portions.

10. The computer readable medium of claim 8, wherein a sensor element collects data from any one of:
a machine;
a material input into a machine; and
a human operator.

11. The computer readable medium of claim 8, wherein the instructions for generating comprise instructions for:
generating at least one recommendation for optimizing the industrial process, wherein a recommendation includes a proposed change in training of an operator of the industrial process.

12. The computer readable medium of claim 8, wherein the instructions for generating comprise instructions for:
generating at least one recommendation for optimizing the industrial process, wherein a recommendation includes a proposed change in a machine of the industrial process.

13. The computer readable medium of claim 8, wherein the instructions for generating comprise instructions for:
generating at least one recommendation for optimizing the industrial process, wherein a recommendation includes a proposed change in an input material of the industrial process.

14. The computer readable medium of claim 8, wherein the instructions for presenting comprise instructions for:
presenting the at least one recommendation generated to an administrator of the industrial process via a display.

15. An information processing system for optimizing an industrial process, comprising:
a memory for storing data from a plurality of sensor elements, wherein each sensor element collects data from a portion of the industrial process;
a processor configured for filtering the data collected by:
computing the mean and standard deviation of the collected data and separating the collected data into a collection of spurious data and a collection of filtered data based upon whether the collected data is a preselected multiple of the standard deviation above or a preselected multiple of the standard deviation below, respectively, the computed mean; or
separating the collected data into a collection of spurious data and a collection of filtered data based upon whether the collected data repeats itself within a given time threshold; or
separating the collected data into a collection of spurious data and a collection of filtered data based upon whether the collected data is below a preselected threshold;
and generating at least one recommendation for optimizing the industrial process based upon the collection of filtered data; and
an interface for presenting the at least one recommendation generated to an administrator of the industrial process.

16. The information processing system of claim 15, wherein the industrial process comprises a plurality of portions.

17. The information processing system of claim 15, wherein a sensor element collects data from any one of:
a machine;
a material input into a machine; and
a human operator.

18. The information processing system of claim 15, wherein a recommendation includes a proposed change in training of an operator of the industrial process.

19. The information processing system of claim 15, wherein a recommendation includes a proposed change in a machine of the industrial process.

20. The information processing system of claim 15, wherein a recommendation includes a proposed change in an input material of the industrial process.

* * * * *